United States Patent
Han et al.

(10) Patent No.: US 12,556,984 B2
(45) Date of Patent: Feb. 17, 2026

(54) WIRELESS COMMUNICATION DEVICE INCLUDING ONE OR MORE SIMS AND OPERATING METHOD THEREOF

(71) Applicant: Samsung Electronics Co., Ltd., Suwon-si (KR)

(72) Inventors: Dongku Han, Suwon-si (KR); Aparna Sateesh Kini, Bengaluru (IN); Gaurav Kumar Tiwari, Bengaluru (IN); Harshit Jagdishbhai Champaneri, Bengaluru (IN); Yungeun Kwag, Suwon-si (KR); Jihun No, Suwon-si (KR); Denis Vinogradov, Suwon-si (KR); Seungah Lim, Suwon-si (KR); Gounil Park, Suwon-si (KR); Inho Baek, Suwon-si (KR); Kyeungjin Song, Suwon-si (KR); Kisoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 18/191,310

(22) Filed: Mar. 28, 2023

(65) Prior Publication Data
US 2023/0319655 A1    Oct. 5, 2023

(30) Foreign Application Priority Data

Mar. 31, 2022   (IN) .............................. 202241019210
Aug. 24, 2022   (KR) ........................ 10-2022-0106339

(51) Int. Cl.
*H04W 36/00*   (2009.01)
*H04M 7/00*    (2006.01)
(Continued)

(52) U.S. Cl.
CPC ....... *H04W 36/0069* (2018.08); *H04M 7/006* (2013.01); *H04W 36/14* (2013.01); *H04W 88/06* (2013.01)

(58) Field of Classification Search
CPC . H04M 7/006; H04W 36/14; H04W 36/0069; H04W 88/06
See application file for complete search history.

(56) References Cited

U.S. PATENT DOCUMENTS 11,039,297 B1   6/2021   Desai et al.
2006/0286984 A1  12/2006  Bonner
(Continued)

FOREIGN PATENT DOCUMENTS

EP    3442272 B1      5/2020
IN    202021028839    1/2022
(Continued)

OTHER PUBLICATIONS

Indian Office Action, dated Feb. 12, 2024, issued in Indian Patent Application No. 202241019210.
(Continued)

*Primary Examiner* — Melanie Jagannathan
(74) *Attorney, Agent, or Firm* — Fish & Richardson P.C.

(57) ABSTRACT

Wireless communication device including one or more SIMs and operating method thereof are provided. The operating method includes performing a first call with a first device using a first SIM, the first call being based on a first RAT, receiving a connection request for a second call from a second device using a second SIM, the connection request for the second call being based on the first RAT, determining whether the first SIM is to perform a handover to a second RAT for the first call, performing the handover of the first call to the second RAT in response to determining the first SIM is to perform the handover to the second RAT, and
(Continued)

contemporaneously performing the second call and the first call after the performing the handover of the first call to the second RAT, the first call being performed using the first SIM, the first RAT including at least one of VoLTE or VoNR, and the second RAT including VoWiFi.

20 Claims, 23 Drawing Sheets

(51) Int. Cl.
  *H04W 36/14* (2009.01)
  *H04W 88/06* (2009.01)

(56) References Cited

U.S. PATENT DOCUMENTS

| | | | |
|---|---|---|---|
| 2015/0119103 | A1 | 4/2015 | Ngai et al. |
| 2015/0282237 | A1* | 10/2015 | Su ............... H04W 76/16 455/552.1 |
| 2015/0334578 | A1* | 11/2015 | Movva ......... H04W 36/008375 370/241 |
| 2016/0029222 | A1 | 1/2016 | Su et al. |
| 2016/0262200 | A1 | 9/2016 | Su |
| 2016/0337515 | A1 | 11/2016 | Shi et al. |
| 2017/0171902 | A1* | 6/2017 | Tillman ............. H04W 76/16 |
| 2018/0115978 | A1 | 4/2018 | Shi et al. |
| 2018/0132146 | A1* | 5/2018 | Lee ................. H04W 36/0007 |
| 2020/0296638 | A1* | 9/2020 | Tsai ................ H04W 36/302 |
| 2020/0304984 | A1 | 9/2020 | Dhanapal et al. |
| 2020/0359278 | A1* | 11/2020 | Dhanani .............. H04W 4/80 |
| 2021/0068018 | A1* | 3/2021 | Kim ................. H04W 36/14 |
| 2021/0099848 | A1* | 4/2021 | Ruan ................ H04W 84/042 |
| 2021/0219362 | A1* | 7/2021 | Lee .................. H04L 41/0813 |
| 2022/0015165 | A1 | 1/2022 | Han et al. |
| 2022/0022103 | A1* | 1/2022 | Prakasam ............. H04W 60/00 |
| 2022/0053607 | A1* | 2/2022 | Rice ................... H04W 72/569 |
| 2023/0269636 | A1* | 8/2023 | Lee ..................... H04W 36/305 370/331 |
| 2023/0276310 | A1* | 8/2023 | Zhao .................. H04W 36/249 370/331 |
| 2023/0284308 | A1* | 9/2023 | Prabhakar ............ H04W 60/04 370/329 |
| 2024/0172068 | A1* | 5/2024 | Roopesh .......... H04W 36/0085 |
| 2024/0406782 | A1* | 12/2024 | Krishnamurthy ..... H04W 72/54 |
| 2025/0056202 | A1* | 2/2025 | Liu ........................ H04W 8/18 |
| 2025/0220547 | A1* | 7/2025 | Kim .................... H04W 36/362 |

FOREIGN PATENT DOCUMENTS

| | | |
|---|---|---|
| WO | WO-2014-121305 A2 | 8/2014 |
| WO | WO-2014-153565 A2 | 9/2014 |
| WO | 2017069894 A1 | 4/2017 |
| WO | WO-2017-114932 A1 | 7/2017 |
| WO | WO-2018-176675 A1 | 10/2018 |
| WO | WO-2019-109350 A1 | 6/2019 |

OTHER PUBLICATIONS

"Dual Connectivity for LTE-NR Cellular Networks:Challenges and Open Issues" *Journal Of Communication And Information Systems* (2018).

Unlicensed LTE Explained—LTE-U vs. LAA vs. LWA vs. Multefire_ Leverege https://www.leverege.com/blogpost/unlicensed-lte-lte-u-vs-laa-vs-lwa-vs-multefire, dated Jun. 8, 2017.

GSM Association Official Document NG.110—Multi Devicehttps://www.gsma.com/newsroom/wp-content/uploads//NG.110-v3.0-2.pdf, dated May 13, 2020.

LTE-WLAN Aggregation—Wikipedia https://en.wikipedia.org/wiki/LTE-WLAN_Aggregation, retrieved Mar. 24, 2023.

* cited by examiner

FIG. 7A

| SA+LTE | | SIM2 | | | | | | |
|---|---|---|---|---|---|---|---|---|
| | | B3 | B34 | B39 | B8 | B38 | B40 | B41 |
| SIM1 | n41 (4RX) | Dual Connection | MIMO | Dual Connection | Dual Connection | MIMO | Dual Connection | MIMO |
| | n79 (4RX) | Dual Connection | Dual Connection | Dual Connection | Dual Connection | Dual Connection | Dual Connection | Dual Connection |

FIG. 7B

| SA+SA | | SIM2 | | |
|---|---|---|---|---|
| | | n28 (2RX) | n41 (4RX) | n79 (4RX) |
| SIM1 | n28 (2RX) | Dual Connection | Dual Connection | Dual Connection |
| | n41 (4RX) | Dual Connection | Intra-band Carrier Aggregation | Dual Connection |
| | n79 (4RX) | Dual Connection | Dual Connection | Intra-band Carrier Aggregation | able# WIRELESS COMMUNICATION DEVICE INCLUDING ONE OR MORE SIMS AND OPERATING METHOD THEREOF

CROSS-REFERENCE TO RELATED APPLICATIONS

This application claims the benefit of Indian Patent Application No. 202241019210, filed on Mar. 31, 2022, in the Indian Patent Office and Korean Patent Application No. 10-2022-0106339, filed on Aug. 24, 2022, in the Korean Intellectual Property Office, the disclosures of which are incorporated herein in their entirety by reference.

BACKGROUND

The inventive concepts relate to a wireless communication device including one or more subscriber identity modules (SIMs).

Multi-SIM wireless communication devices, such as mobile phones, personal digital assistants, tablets, laptops, etc., may include two or more SIM cards. When a dual SIM dual standby (DSDS) multi-SIM wireless communication device performs a wireless communication connection with an external terminal device through a first SIM, the first SIM may occupy a radio frequency (RF) resource of the multi-SIM wireless communication device. Thus, when a new wireless call request for a second SIM occurs during a wireless call of the first SIM, a multi-SIM dual receive DSDS (DR-DSDS) wireless communication device terminates the existing call on the first SIM or rejects the new call connection on the second SIM.

SUMMARY

The inventive concepts provide a wireless communication device including one or more subscriber identity modules (SIMs), and an operating method thereof.

According to an aspect of the inventive concepts, there is provided an operating method of a wireless communication device including a first subscriber identity module (SIM) and a second SIM, the operating method including performing a first call with a first device using the first SIM, the first call being based on a first radio access technology (RAT), receiving a connection request for a second call from a second device using the second SIM, the connection request for the second call being based on the first RAT, determining whether the first SIM is to perform a handover to a second RAT for the first call, performing the handover of the first call to the second RAT in response to determining the first SIM is to perform the handover to the second RAT, and contemporaneously performing the second call and the first call after the performing the handover of the first call to the second RAT, the first call being performed using the first SIM, in which the first RAT includes at least one of voice over Long-Term-Evolution (VoLTE) or Voice over New Radio (VoNR), and the second RAT includes Voice over Wireless Fidelity (VoWiFi).

According to an aspect of the inventive concepts, there is provided an operating method of a wireless communication device including a first subscriber identity module (SIM) and a second SIM, the operating method including performing a first call with a first device using the first SIM, the first call being based on a first radio access technology (RAT), receiving a connection request for a second call from a second device using the second SIM, the connection request for the second call being based on a second RAT, determining to maintain the first RAT for the first call, and performing the first call and the second call by using the first SIM, the first RAT including Voice over Wireless Fidelity (VoWiFi), and the second RAT including at least one of voice over Long-Term-Evolution (VoLTE) or Voice over New Radio (VoNR).

According to an aspect of the inventive concepts, there is provided a wireless communication device including a first subscriber identity module (SIM), a second SIM, a radio frequency integrated circuit (RFIC), and processing circuitry configured to control the first SIM to perform a first call with a first device, control the second SIM to receive a connection request for a second call from a second device through the RFIC, determine whether the first SIM is to perform a handover to a first radio access technology (RAT) for the first call, the first RAT including Voice over Wireless Fidelity (VoWiFi), and control the first SIM to perform the handover of the first call to the first RAT in response to determining the first SIM is to perform the handover to the first RAT, and contemporaneously perform the second call and the first call after performing the handover of the first call to the first RAT.

BRIEF DESCRIPTION OF THE DRAWINGS

Embodiments will be more clearly understood from the following detailed description taken in conjunction with the accompanying drawings in which:

FIGS. 7A and 7B illustrate an example of combination of a radio frequency (RF) band of a first subscriber identity module (SIM) and a second SIM according to embodiments;

DETAILED DESCRIPTION

Figure 1:
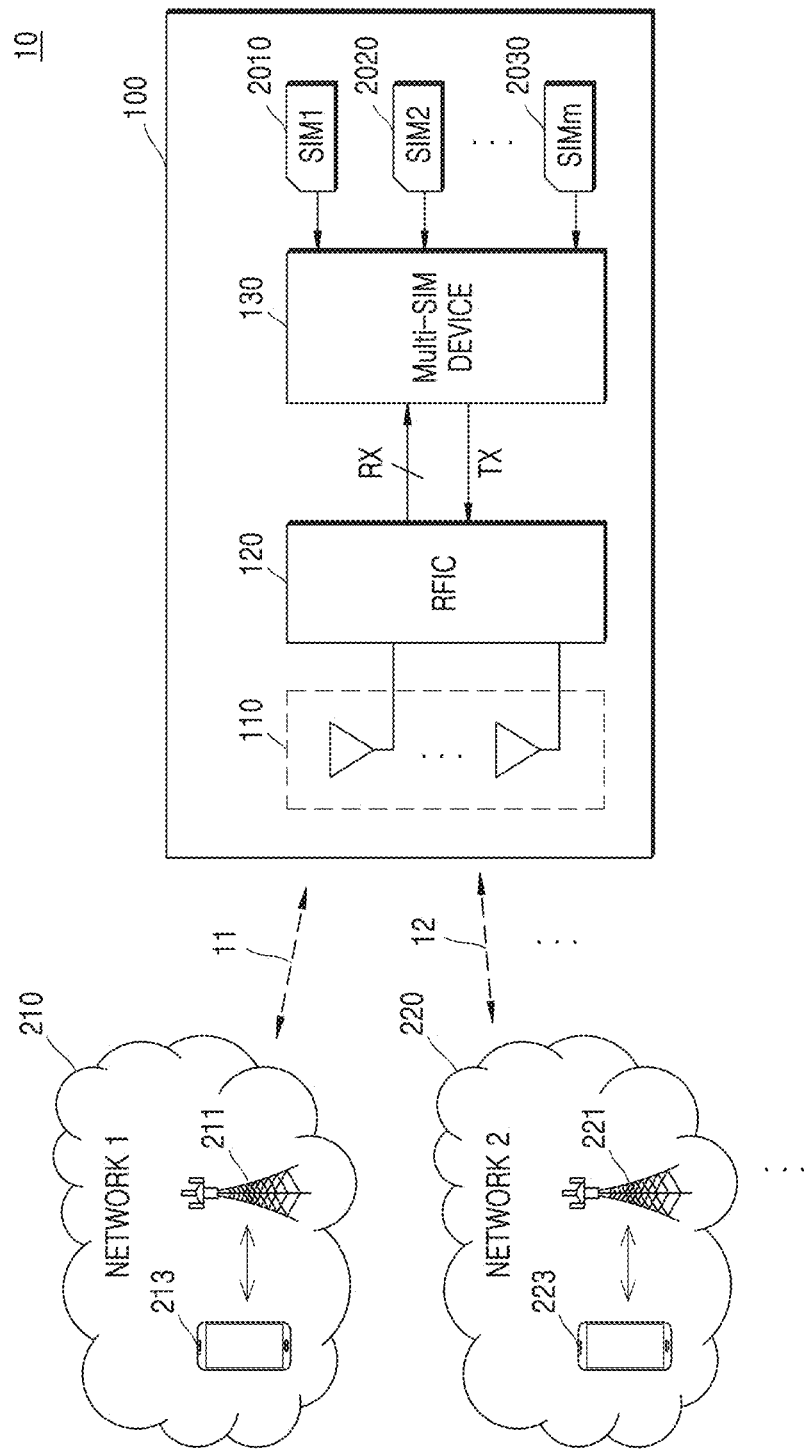
FIG. 1 is a block diagram illustrating a wireless communication system according to embodiments.

FIG. 1 is a block diagram illustrating a wireless communication system according to embodiments. Referring to FIG. 1, a wireless communication system 10 may include a wireless communication device 100, a first network 210 and/or a second network 220.

The wireless communication device 100 may be fixed or may be mobile, and may refer to a device that may transmit/receive data, and/or control information, to/from a first base station 211 and a second base station 221 by performing wireless communication with the first network 210 and the second network 220 (also referred to herein as the plurality of networks 210 and 220). For example, the wireless communication device 100 may be referred to as a terminal, terminal equipment, a terminal device, a mobile station (MS), a mobile termination (MT), a user terminal (UT), a subscriber station (SS), a wireless device, a handheld device, user equipment (UE), and the like.

Each of the plurality of networks 210 and 220 may include the first base stations 211 or the second base station 221, and a first terminal device 213 or a second terminal device 223 respectively connected to the first or second base station 211 or 221. The first base station 211 and/or the second base station 221 may refer to a fixed station that communicates with the wireless communication device 100, the first or second terminal device 213 or 223, and/or other base stations. The first base station 211 and/or the second base station 221 may exchange data and control information with the wireless communication device 100, the first or second terminal device 213 or 223, and/or other base stations (not shown) by communicating therewith. For example, the first base station 211 and/or the second base station 221 may be referred to as a Node B, an evolved Node B (eNB), a next generation Node B (gNB), a sector, a site, a base transceiver system (BTS), an access point (AP), a relay node, a remote radio head (RRH), a radio unit (RU), a small cell, or the like.

In embodiments of the present disclosure, the first base station 211 and/or the second base station 221 may be interpreted as a comprehensive meaning that represents a partial region or function covered by a base station controller (BSC) in a code division multiple access network (CDMA), a Node B of a wideband CDMA (WCDMA), an eNB in long term evolution (LTE), and/or a gNB or a sector in 5th generation (5G) new radio (NR). In addition, the first base station 211 and/or the second base station 221 may include various coverage regions, such as a mega cell, a macrocell, a microcell, a picocell, a Femtocell, a relay node, an RRH, an RU, a small cell communication range, and the like.

The wireless communication device 100 may be connected to the first network 210 through the first base station 211. The wireless communication device 100 may be connected to the second network 220 through the second base station 221. The wireless communication device 100 may communicate with the first network 210 and the second network 220 based on respective radio access technology (RAT). For example, the wireless communication device 100 may communicate with the first network 210 and the second network 220, in a non-limiting example, according to a 5G system, a 5G new radio (NR) system, an LTE system, a CDMA system, a global system for mobile communications (GSM) system, a wireless local area network (WLAN) system, and/or other RATs. The wireless communication device 100 may communicate with the first network 210 and the second network 220 according to the same RAT (or similar RATs) in embodiments, and may communicate with the first network 210 and the second network 220 according to different RATs in embodiments.

The wireless communication device 100 may include an antenna array 110, a radio frequency integrated circuit (RFIC) 120, a multi-SIM device 130, and/or m SIMs 2010, 2020, . . . , and 2030 (where m is an integer greater than 1), as shown in FIG. 1. The antenna array 110 may include at least one antenna, may receive an RF signal from the first base station 211 and the second base station 221, and/or may transmit an RF signal to the first base station 211 and the second base station 221. In embodiments, the antenna array 110 may include a plurality of antennas for multi-input multi-output (MIMO).

The RFIC 120 may be hardware connected to the antenna array 110 and the multi-SIM device 130, and may provide an RF resource (e.g., an RF path) for wireless communication to the multi-SIM device 130. For example, the RFIC 120 may be referred to as a transceiver. The RFIC 120 may process the RF signal received from the antenna array 110, thereby providing a received signal RX as a baseband signal to the multi-SIM device 130. The RFIC 120 may process a transmitted signal TX as a baseband signal, thereby providing the RF signal to the antenna array 110. The RFIC 120 may be controlled by the multi-SIM device 130, and in a non-limiting example, may include switches, matching circuits, filters, amplifiers, and/or mixers.

The multi-SIM device 130 may communicate with the RFIC 120 via baseband signals RX and TX and may be combined with a first SIM 2010, a second SIM 2020, . . . , and $m^{th}$ SIM 2030 (wherein m is an integer greater than 1). For example, the first SIM 2010 may include information for accessing the first network 210 via a first wireless communication 11, and the second SIM 2020 may include information for accessing the second network 220 via a second wireless communication 12. The multi-SIM device 130 may have an architecture for processing a connection related to the first SIM 2010 and a connection related to the second SIM 2020. In embodiments, the multi-SIM device 130 may include a hardware block designed through logic synthesis, a software block including a series of instructions, a processing unit including at least one processor for executing the series of instructions, and a combination thereof. In embodiments, the multi-SIM device 130 may be referred to as a modem or baseband processor.

The m SIMs 2010, 2020, . . . , and 2030 may support multi-SIM wireless communication. For example, referring to FIG. 1, the first SIM 2010 may perform the first wireless communication 11 related to the first network 210 including the first base station 211 and the first terminal device 213, and the second SIM 2020 may perform second wireless communication 12 related to the second network 220 including the second base station 221 and the second terminal device 223. The first wireless communication 11 and the second wireless communication 12 may be respectively referred to as a first connection and a second connection, and may also be respectively referred to as a first subscription and a second subscription.

When the wireless communication device 100 performs two wireless communications related to the first SIM 2010 and the second SIM 2020, the wireless communication device 100 may be referred to as a dual-SIM device. The wireless communication device 100 may operate as one of a dual SIM dual standby (DSDS) device (or dual stack dual standby device), a dual receive-dual-SIM dual-standby (DR-DSDS) device, and/or a dual-SIM dual-active (DSDA) device.

When the wireless communication device 100 is a DR-DSDS device, two SIMs 2010 and 2020 may share an RF resource (e.g., a RF path) provided by the RFIC 120. Thus, two SIMs 2010 and 2020 may use the RFIC 120 mutually exclusively so as to perform communication. Thus, one of the first wireless communication 11 and the second wireless communication 12 may be suspended.

For example, the first SIM 2010 may receive a mobile termination (MT) call request from the first terminal device 213 through the first base station 211 and may perform a first call in response to the received call request. In this case, the first SIM 2010 may occupy the RFIC 120 so as to perform the first call, and the second wireless communication 12 through the second SIM 2020 may be suspended. The second SIM 2020 may receive a new second call request from the second terminal device 223 through the second base station 221, and when receiving an accept signal for the second call request from a user of the wireless communication device 100, the second SIM 2020 may occupy the RFIC 120 instead of the first SIM 2010. Thus, a second call between the second SIM 2020 and the second terminal device 223 may have a call active state, and a first call between the first SIM 2010 and the first terminal device 213 may be changed into a call hold state.

In general, changing of the first call into a call hold state does not mean that the first call is not immediately (or promptly) followed by a call drop at which communication is terminated. However, because the first SIM 2010 does not occupy the RFIC 120 due to the second SIM 2020, the first SIM 2010 may not transmit/receive a signal to/from the first base station 211. The first base station 211 may drop the first call when there is no transmission/reception of a signal to/from the first SIM 2010 for a certain amount of time. Thus, the wireless communication device 100 according to the related art may temporarily maintain the first wireless communication 11 through the first SIM 2010 and the second wireless communication 12 through the second SIM 2020 but may not maintain continuously the first wireless communication 11 and the second wireless communication 12.

The wireless communication device 100 according to embodiments is a DR-DSDS device. However, the same technical spirit of the inventive concepts may also be applied to a case where the wireless communication device 100 is a DSDA device. That is, the same technical spirit of the present disclosure may also be applied to even when the RFIC 120 of the wireless communication device 100 provides independent RF resources to two SIMs 2010 and 2020, respectively and two SIMs 2010 and 2020 of the wireless communication device 100 may perform reception independently.

In addition, in embodiments, wireless communication using two SIMs 2010 and 2020, e.g., dual-SIM wireless communication, will be mainly described. However, embodiments of the present disclosure may also be applied to multi-SIM wireless communication using three or more SIMs. According to embodiments, the wireless communication device 100 may include three SIMs, fewer than three SIMs (e.g., two SIMs), or more than three SIMs.

In addition, FIG. 1 illustrates that the wireless communication device 100 includes the antenna array 110, the RFIC 120, the multi-SIM device 130 and m SIMs 2010, 2020, . . . , and 2030. However, the wireless communication device 100 may include an input device (not shown) that receives user's input and a display (not shown) that displays information to the user.

Figure 2:
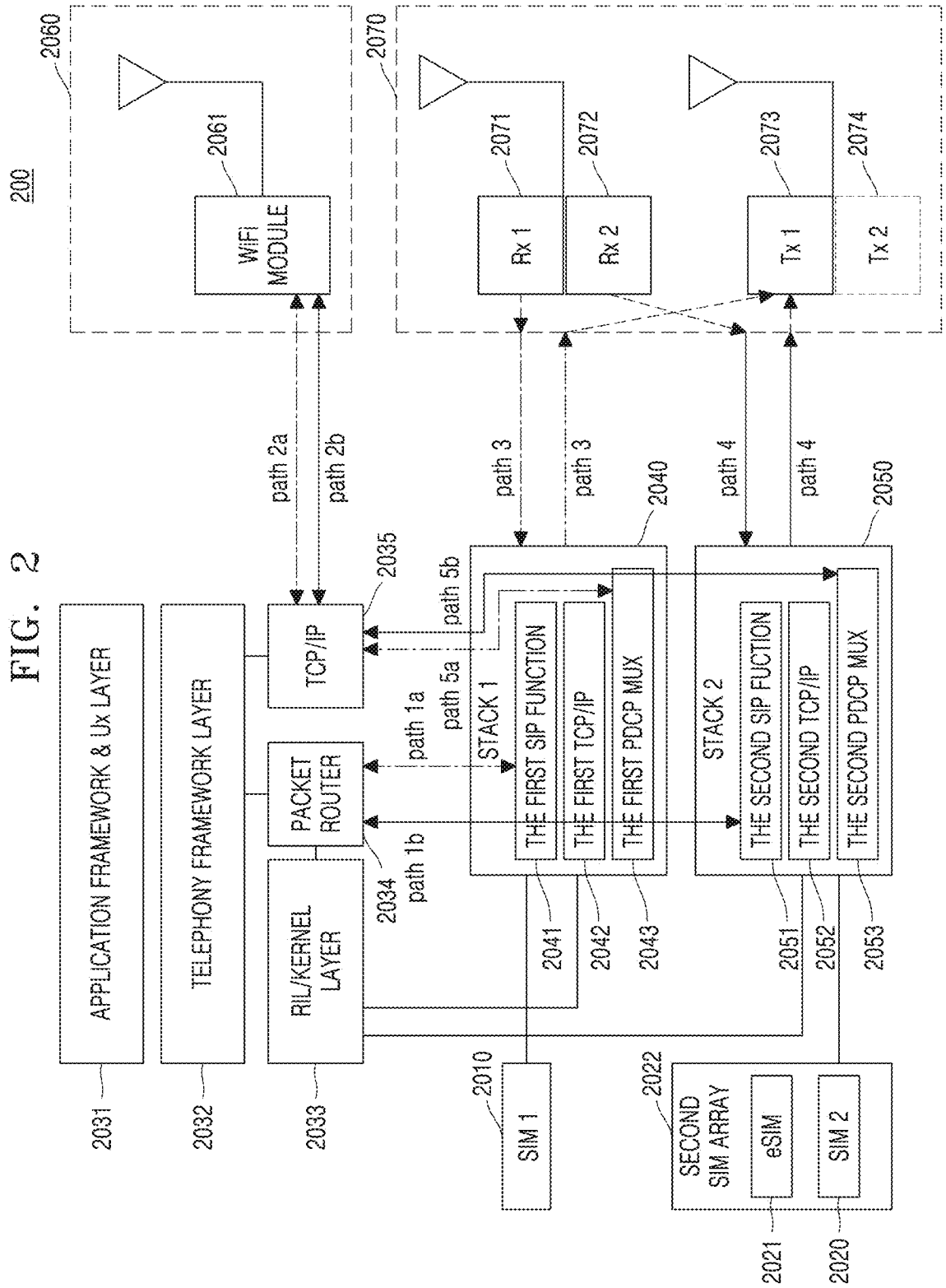
FIG. 2 is a block diagram of a wireless communication device according to embodiments.

FIG. 2 is a block diagram of a wireless communication device according to embodiments.

A wireless communication device 200 of FIG. 2 illustrates an example of the wireless communication device (100 of FIG. 1) of FIG. 1. The wireless communication device 200 may include a first stack 2040, a second stack 2050, a first SIM 2010, and/or a second SIM array 2022. The first SIM 2010 may refer to a nano SIM. The second SIM array 2022 may include an eSIM 2021 and a second SIM 2020. The second SIM 2020 may refer to a nano SIM. The second SIM 2020 may refer to an eSIM in some cases. An eSIM may refer to a SIM embedded in a chip manner. In the eSIM, provisioning and activation may not be performed.

In the present disclosure, performing of an operation by the first stack 2040 may mean that the first SIM 2010 performs an operation, and performing of an operation by the second stack 2050 may mean that the second SIM 2020 performs an operation.

The first stack 2040 may be referred to as a primary stack. The first stack 2040 may include a first session initiation protocol (SIP) function 2041, a first transmission control protocol (TCP)/Internet protocol (IP) 2042 (e.g., a first TCP/IP connection), and/or a first packet data convergence protocol (PDCP) multiplexer (MUX) 2043. The second stack 2050 may include a second SIP function 2051, a second TCP/IP 2052 (e.g., a second TCP/IP connection), and/or a second PDCP MUX 2053.

The first SIP function 2041 and the second SIP function 2051 may be in charge of signaling for an independent IP multimedia subsystem (IMS) call of each stack. Each of the first SIP function 2041 and the second SIP function 2051 may support all of Voice over Long-Term-Evolution (VoLTE), Voice over New Radio (VoNR), and/or Voice over Wireless Fidelity (VoWiFi). Each of the first SIP function 2041 and the second SIP function 2051 may have an inter-process communication (IPC) control connection with a Telephony Framework layer 2032. Each of the first SIP function 2041 and the second SIP function 2051 may support three paths through which connection to a network may be performed through the TCP/IP 2042 or TCP/IP 2052 based on three radio access technology (RAT) methods (a first RAT, a second RAT, and a third RAT).

The first RAT may refer to wireless communication based on at least one of VoLTE and/or VoNR. That is, the first RAT may include at least one of VoLTE and/or VoNR-capable mobile networks. The second RAT may refer to VoWiFi. The third RAT may refer to VoWiFi using a network at which the first SIM 2010 is based on the second SIM 2020 in the wireless communication device 200 including the first SIM and the second SIM. That is, the third RAT may include VoWiFi communication using a mobile network based on different SIMs. The third RAT may include a VoWiFi, e.g., VoMobile or Cross Stack evolved packet data gateway (ePDG), using the mobile network at which a SIM (e.g., the first SIM) is based on a SIM (e.g., the second SIM) different from the SIM. As described below, VoMobile may refer to an ePDG connection through a 3GPP network. According to embodiments, the first RAT may refer to a mobile network (e.g., 3GPP, 5G, etc.) connection (e.g., VoLTE or VoNR) of a given SIM (e.g., the first SIM), the second RAT may refer to a VoWiFi connection via the mobile network connection of the given SIM, and the third RAT may refer to a VoWiFi (e.g., VoMobile) connection via a mobile network connection of another SIM (e.g., the second SIM) different from the first SIM. According to embodiments, the term RAT as used herein may refer to a communication path.

Paths path 1a and path 2a for a WiFi call related to the first stack 2040 may include a first SIP function 2041, a packet router 2034, a TCP/IP 2035 (e.g., a third TCP/IP), and/or a Wi-Fi module 2061. In detail, paths for a WiFi call related to the first stack 2040 may include a path from the first SIP function 2041 to the packet router 2034, a path from the packet router 2034 to the TCP/IP 2035, and a path from the TCP/IP 2035 to the WiFi module 2061. The paths may include the inverse of the order described above. IMS signaling may be supported by Internet Protocol Security (IPsec) tunneling through the packet router 2034 and the TCP/IP 2035.

Paths path 1b and path 2b for a WiFi call related to the second stack 2050 may include a second SIP function 2051, a packet router 2034, a TCP/IP 2035, and/or a WiFi module 2061. In detail, the path for the WiFi call in the second stack 2050 may include a path from the second SIP function 2051 to the packet router 2034, a path from the packet router 2034 to the TCP/IP 2035, and a path from the TCP/IP 2035 to the WiFi module 2061. The paths may include the inverse of the order described above. IMS signaling may be supported by IPsec tunneling through the packet router 2034 and the TCP/IP 2035.

A path (path 3)(a path for the first RAT) for VoLTE or VoNR in the first stack may include a path from a first receiver Rx1 2071 to a first SIP function 2041 and a path from the first SIP function 2041 to a first transmitter Tx1 2073. IMS signaling may be supported by the first TCP/IP 2042 in a modem.

A path (path 4) for VoLTE or VoNR related to the second stack may include a path from a second receiver Rx1 2072 to the second SIP function 2051 and a path from the second SIP function 2051 to the first transmitter Tx1 2073. IMS signaling may be supported through a second TCP/IP 2052 in the modem.

Paths (path 1a, path 5a, path 3) for connecting a VoWiFi call related to the first stack via a 3GPP base station and a core network instead of a WiFi RAT may include the first SIP function 2041, the packet router 2034, the TCP/IP 2035, the first receiver Rx1 2071, and the first transmitter Tx1 2073.

Paths (path 1b, path 5b, path 4) for connecting a VoWiFi call related to the second stack via the 3GPP base station and the core network instead of the WiFi RAT may include the second SIP function 2051, the packet router 2034, the TCP/IP 2035, the second receiver Rx2 2072, and the first transmitter Tx1 2073.

In a WiFi call mode 2060, an ePDG connection to the first SIM 2010 and the second SIM 2020 is possible. That is, the WiFi call mode 2060 may simultaneously (or contemporaneously) support VoWiFi to the first SIM 2010 and the second SIM 2020.

In the present disclosure, the wireless communication device 200 may operate as one of a DSDS device, a DR-DSDS device, and/or a DSDA device, and is not limited to the example of the wireless communication device 200 using the first receiver 2071, the second receiver 2072, and the first transmitter 2073 described above. The WiFi call mode 2060 may support Dual Active to the first SIM 2010 and the second SIM 2020. In the present disclosure, a call may refer to an IMS call. VoWiFi may refer to an IMS call through Wi-Fi.

The DSDS-based wireless communication device 200 according to embodiments may operate to receive paging on both of the two stacks by adjusting a reception slot in an idle state. The DSDS-based wireless communication device 200 may protect an active call by suspending other stacks when a call is in an active state in one stack. Thus, the suspended stack may not receive a call. In order to address this challenge, the wireless communication device according to the present disclosure considers two aspects. First, the DSDS-based wireless communication device 200 according to embodiments of the present disclosure may implement DR-DSDS, which enables other stacks to receive a call even when a call is in an active state in one stack. Second, the DR-DSDS-based wireless communication device 200 according to embodiments of the present disclosure may implement a method, whereby both calls are maintained in an active state like in a dual active terminal. According to embodiments of the present disclosure with respect to the first method, the DSDS-based wireless communication device 200 may operate as a DR-DSDS.

The DR-DSDS-based wireless communication device 200 according to embodiments may simultaneously (or contemporaneously) receive one or more pages in both stacks. For example, the wireless communication device 200 may simultaneously (or contemporaneously) receive two paging signals using two receivers. However, the DR-DSDS-based wireless communication device 200 may use one transmitter Tx. Thus, in the DR-DSDS-based wireless communication device 200, it is difficult to maintain the dual active call. However, according to embodiments of the present disclosure, in the DR-DSDS-based wireless communication device 200, two active calls may be maintained in one stack (or a SIM).

In the DSDA-based wireless communication device 200 according to embodiments, internal RFs may operate independently. For example, the DSDA-based wireless communication device 200 may simultaneously (or contemporaneously) maintain a call in two stacks.

FIGS. 3A through 3D illustrate paths of a network according to embodiments.

Figure 3A:
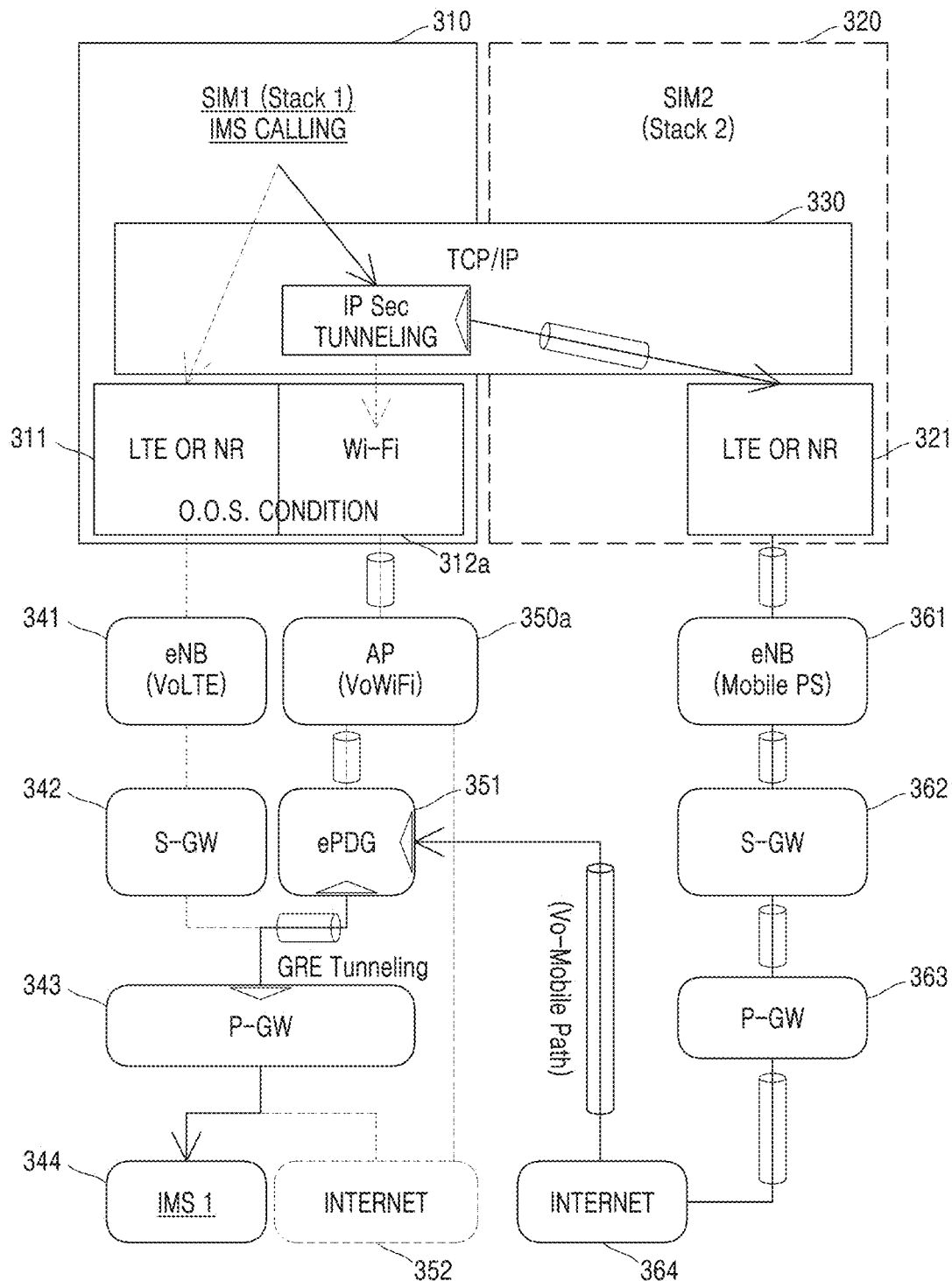
FIGS. 3A through 3D illustrate paths of a network according to embodiments.

FIG. 3A illustrates a path, e.g., a VoMobile Call Path, on which the first SIM 310 performs a WiFi call based on the 3GPP network of the second SIM 320. This illustrates the path on the third RAT described above.

According to embodiments of the present disclosure, an ePDG 351 may refer to a node connected to a 4th generation (4G) network via WiFi for a VoWiFi service. The wireless communication device (200 of FIG. 2) may be connected to a first IMS network 344 through this path. A Non-3GPP Interworking Function (N3IWF) 351b may refer to a node connected to a 5G network through WiFi for a VoWiFi service. The wireless communication device 200 may be connected to an the first IMS network 344 through this path.

Referring to FIG. 3A, all radio frequencies (RFs) of the first SIM 310 may be in an out of service (OOS) state. The first SIM 310 may check whether an Internet connection through the second SIM 320 is valid. The first SIM 310 may access the first IMS network 344 via a 3GPP network based on the second SIM 320. For example, the first SIM 310 may access the first IMS network 344 via LTE networks 361, 362, and 363 based on the second SIM 320. The LTE networks 361, 362, and 363 may include the eNB 361(for example, mobile packet switching), the serving gateway (S-GW) 362, and the packet data network gateway (P-GW) 363. The first SIM 310 may access the first IMS network 344 via the eNB 361, the serving gateway (S-GW) 362, and the packet data network gateway (P-GW) 363 based on the second SIM 320, the Internet 364, and an ePDG 351. This path may be referred to as a cross stack ePDG. According to embodiments of the present disclosure, VoMobile may refer to a method of supporting an IMS call through the cross stack ePDG. In VoWiFi, an ePDG connection through WiFi may be used. The ePDG connection through the 3GPP network may be referred to as VoMobile.

In VoLTE and VoWiFi, the same IMS packet data network (PDN) (or similar IMS PDNs) may be used for the cross stack ePDG. In VoWiFi, IPsec tunneling may be used.

Referring to FIG. 3A, even when the first SIM 310 passes through a network based on the second SIM 320, IPsec tunneling may be performed through the TCP/IP network 330 in order to perform a WiFi call. A path for the Internet 364 may be a path passing through the RAT of the second SIM 320.

In addition, according to embodiments of the present disclosure, when data passes through the ePDG 351, the data may be protected by IPsec tunneling. When the data reaches the ePDG 351, IPsec tunneling may be suspended (or reduced). When the data passes from the ePDG 351 to the P-GW 343, a tunneling protocol may be additionally used. For example, when the data passes from the ePDG 351 to the P-GW 343, generic routing encapsulation (GRE) tunneling may be used. The examples described above may be applied to a 5G network, and the present disclosure is not limited to the examples described above. For example, when the data passes from an N3IWF 351b to a User Plane Function (UPF) 368, GRE tunneling may be additionally used.

Figure 3B:
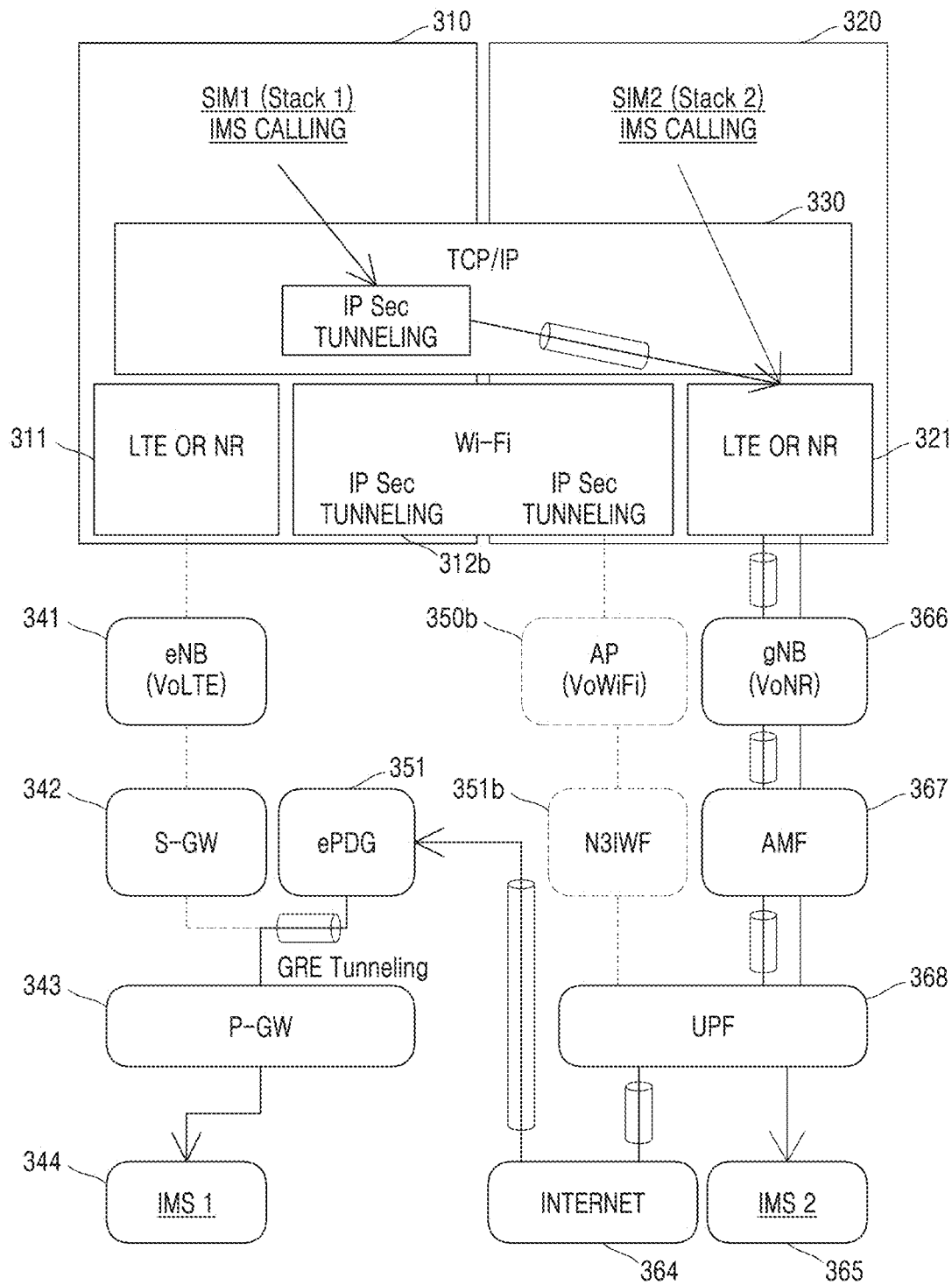

Referring to FIG. 3B, the first SIM 310 may access the first IMS network 344 via 5G networks 366, 367, and 368 based on the second SIM 320. The 5G networks 366, 367, and 368 may include a gNB 366, an access management function (AMF) 367, and a user plane function (UPF) 368. The first SIM 310 may access the first IMS network 344 via a network based on the second SIM 320 and the ePDG 351. This path may be referred to as a cross stack ePDG.

Figure 3C:
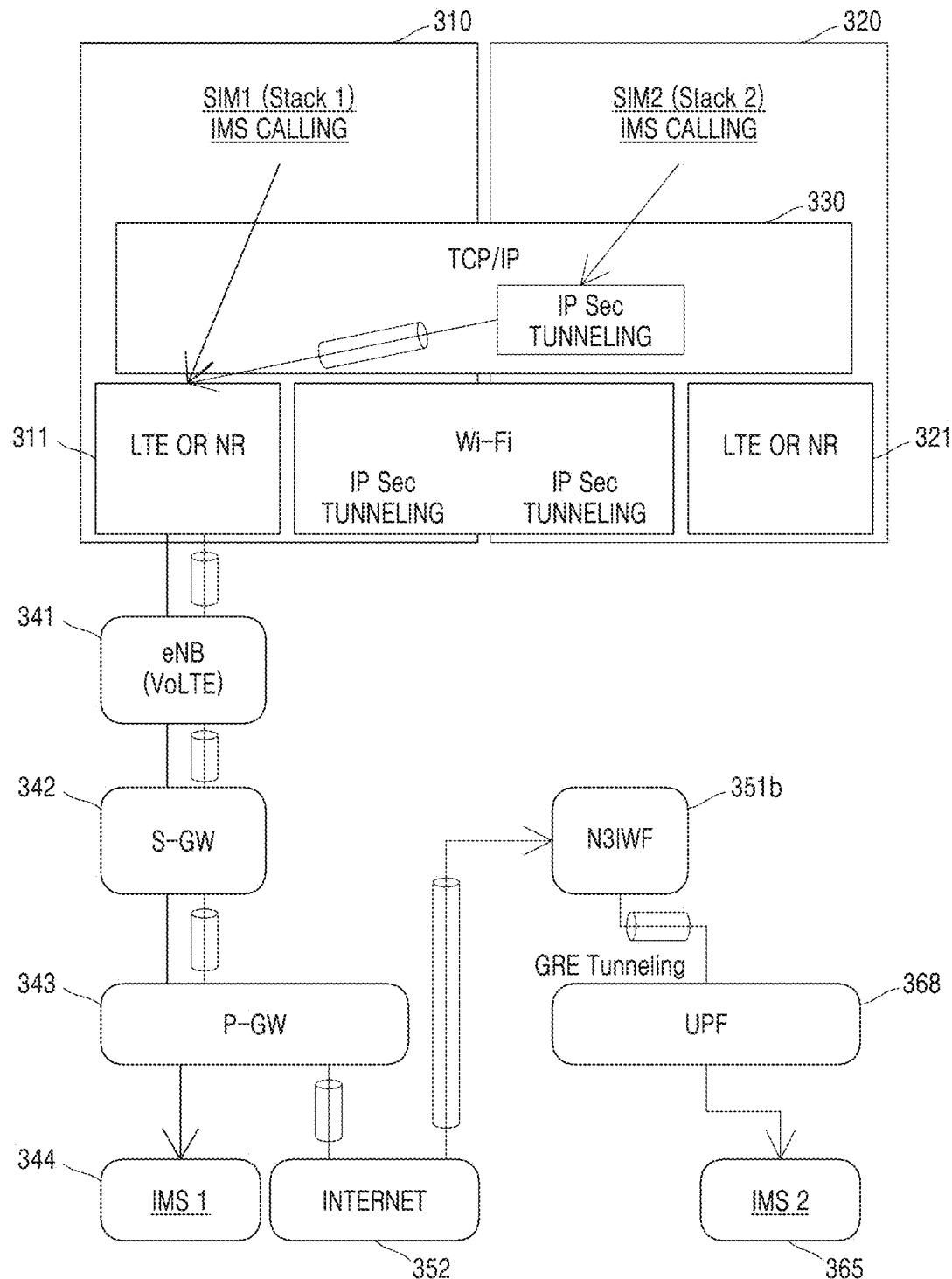

Referring to FIG. 3C, the second SIM 320 may access the second IMS network 365 via networks 341, 342, and 343 based on the first SIM 310. In detail, the second SIM 320 may access the second IMS network 365 via the networks 341, 342, and 343 based on the first SIM 310 and an N3IWF 351b. When the second SIM 320 is based on an LTE network, the second SIM 320 may pass through the ePDG instead of the N3IWF 351b on the path described above.

Referring to FIGS. 3A, 3B, and 3C, one of two stacks may operate in such a way that both calls are active. For example, one of two stacks may perform two calls based on the combination of VoLTE and VoMobile.

Figure 3D:
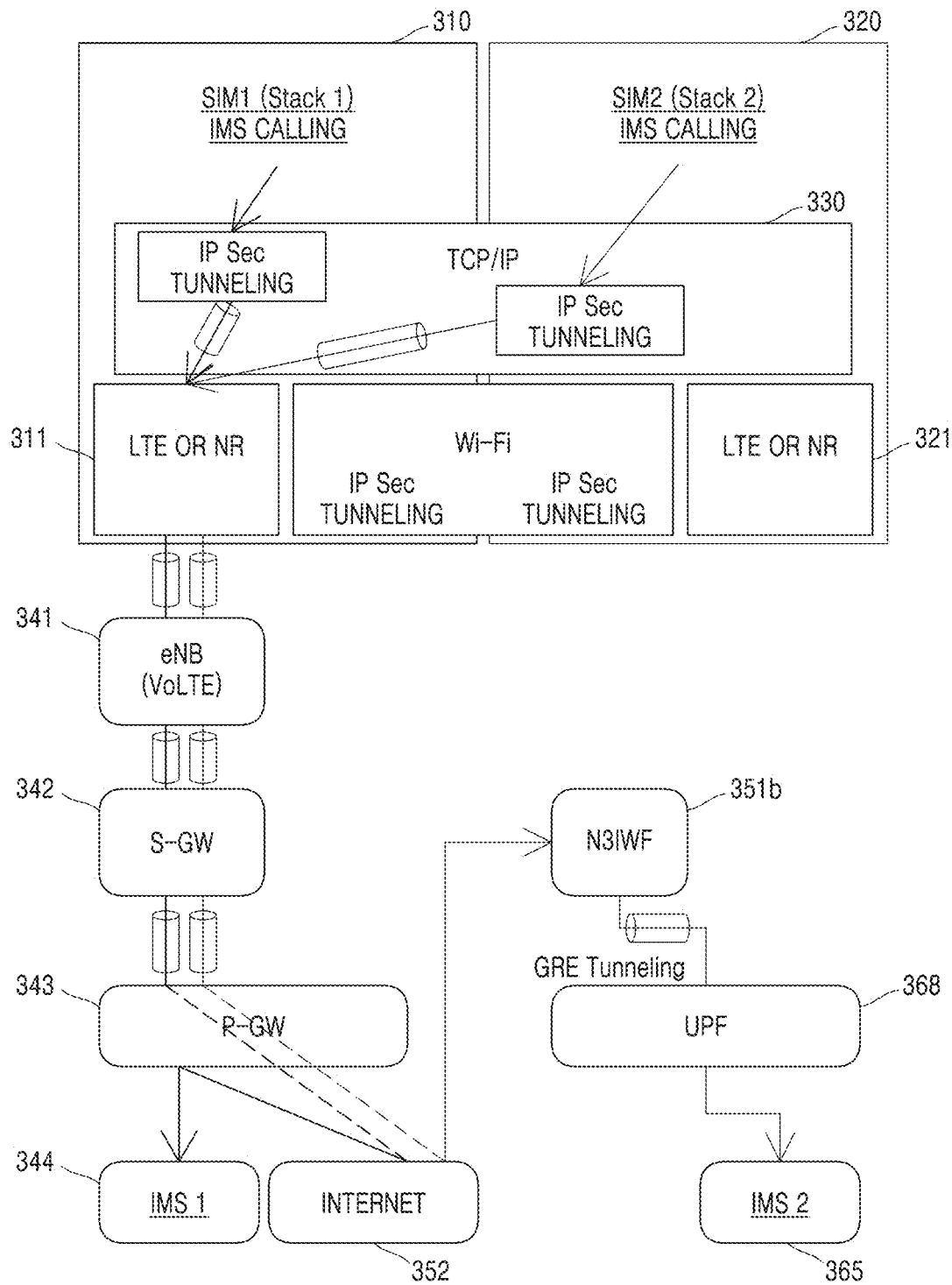

Referring to FIG. 3D, two VoMobile calls may be performed by the first SIM 310. In the first SIM 310, each of both calls may be maintained based on VoMobile. For example, the first SIM 310 and the second SIM 320 may respectively access the first IMS network 344 and the second IMS network 365 via only the Internet PDNs (P-GW 343 and Internet 352) on the first SIM 310 so as to maintain the call. In a specific example, even when the first SIM 310 is based on a 3G network at which an IMS PDN is not directly set, two calls may be maintained.

As in the examples described above, the wireless communication device 200 may collect two calls in one-side stack so that interference between internal stacks may be reduced and efficiency may be increased. This operating method may also be applied to a device based on DSDS and a device based on DR-DSDS.

Figure 4:
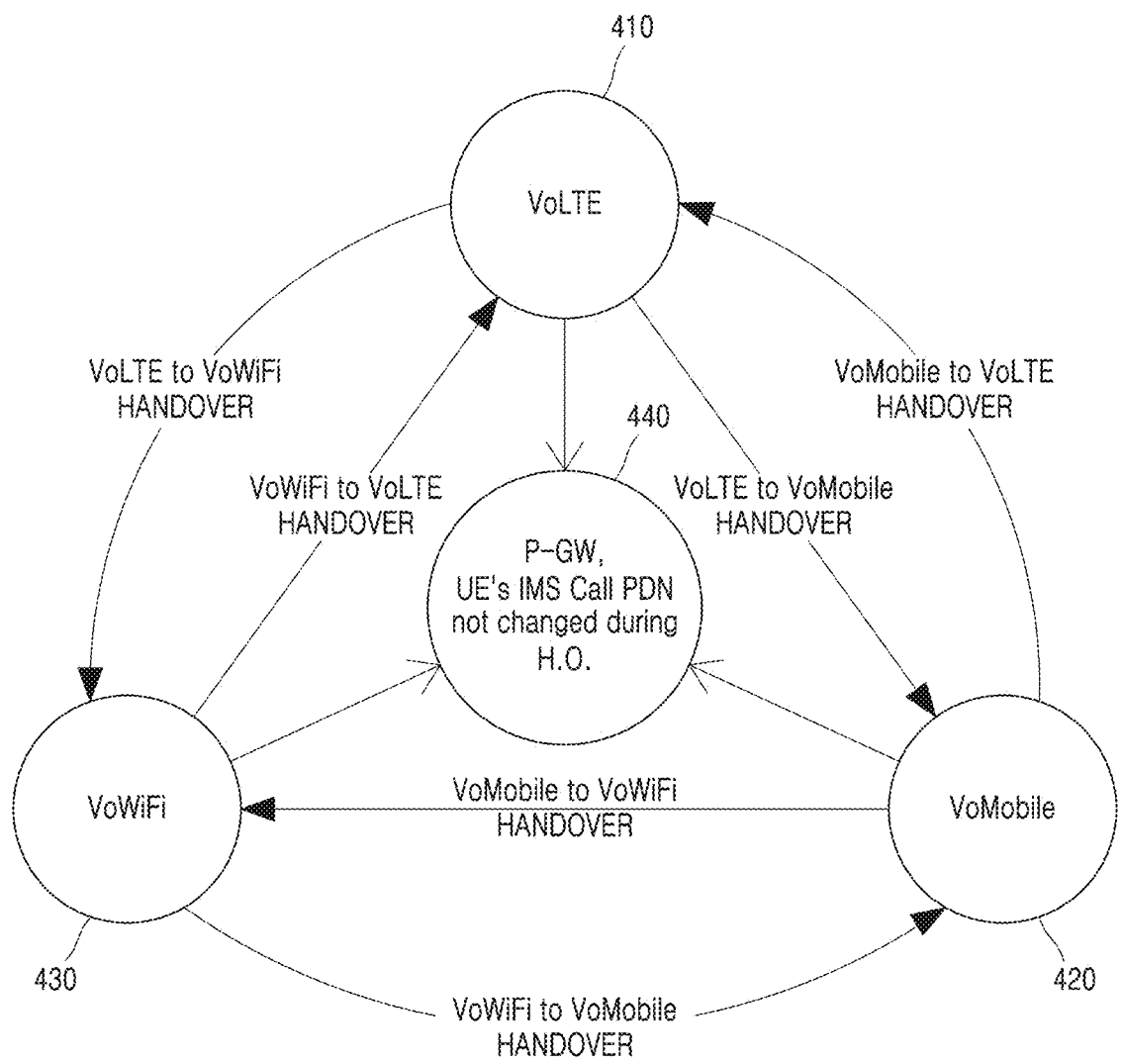
FIG. 4 illustrates an example of handover according to embodiments.

FIG. 4 illustrates an example of handover according to embodiments.

The first SIM (2010 of FIG. 2) and the second SIM (2020 of FIG. 2) may perform idle or active call handover from VoLTE 410 to VoWiFi 430. The first SIM 2010 and the second SIM 2020 may perform idle or active call handover from VoWiFi 430 to VoMobile 420. The first SIM 2010 and the second SIM 2020 may perform idle or active call handover from VoMobile 420 to VoLTE 410. The first SIM 2010 and the second SIM 2020 may also reverse the handovers described above. While the first SIM 2010 and the second SIM 2020 perform handovers, the IMS call may not be changed. Specifically, while the first SIM 2010 and the second SIM 2020 perform handovers, a connection from the P-GW 440 to the IMS network may not be changed.

In the present disclosure, the name of an active call may refer to any one of a VoLTE call, a VoNR call, and/or a VoWiFi call. The active call may be expanded and applied to various services based on packet switched (PS) data.

While the wireless communication device (200 of FIG. 2) performs handover, a TCP/IP connection of a device connected to the wireless communication device 200 may be continuously maintained. In the case of a WiFi call or VoMobile call, an ePDG connection may operate based on tunneling. Thus, an IMS PDN-related environment may not be changed.

Active call handover may include horizontal handover and/or vertical handover. Horizontal handover may include handover between LTE base stations, handover between the LTE base station and another NR base station, and/or handover between NR base stations. Vertical handover may include handover between different services, such as handover between VoLTE and WiFi. In addition, vertical handover may include handover between the same RAT (or similar RATs) and a different service, like in handover between VoLTE and VoMobile. In addition, vertical handover may include handover between the same service (or similar services) and a different RAT, like in handover between VoWiFi and VoMobile.

Referring to FIG. 4, IMS Call PDN may not be changed during handover. When the data passes through ePDG, the data may be encapsulated based on IPsec tunneling. Thus, a transmission control protocol/user datagram protocol (TCP/UDP) session between the wireless communication device 200 and another device may be maintained without changes. A call between the wireless communication device 200 and another device may be maintained.

The handover of FIG. 4 may be referred to as a handover cycle, and a handover determination module to be described below may determine whether handover is performed considering the handover cycle.

Figure 5:
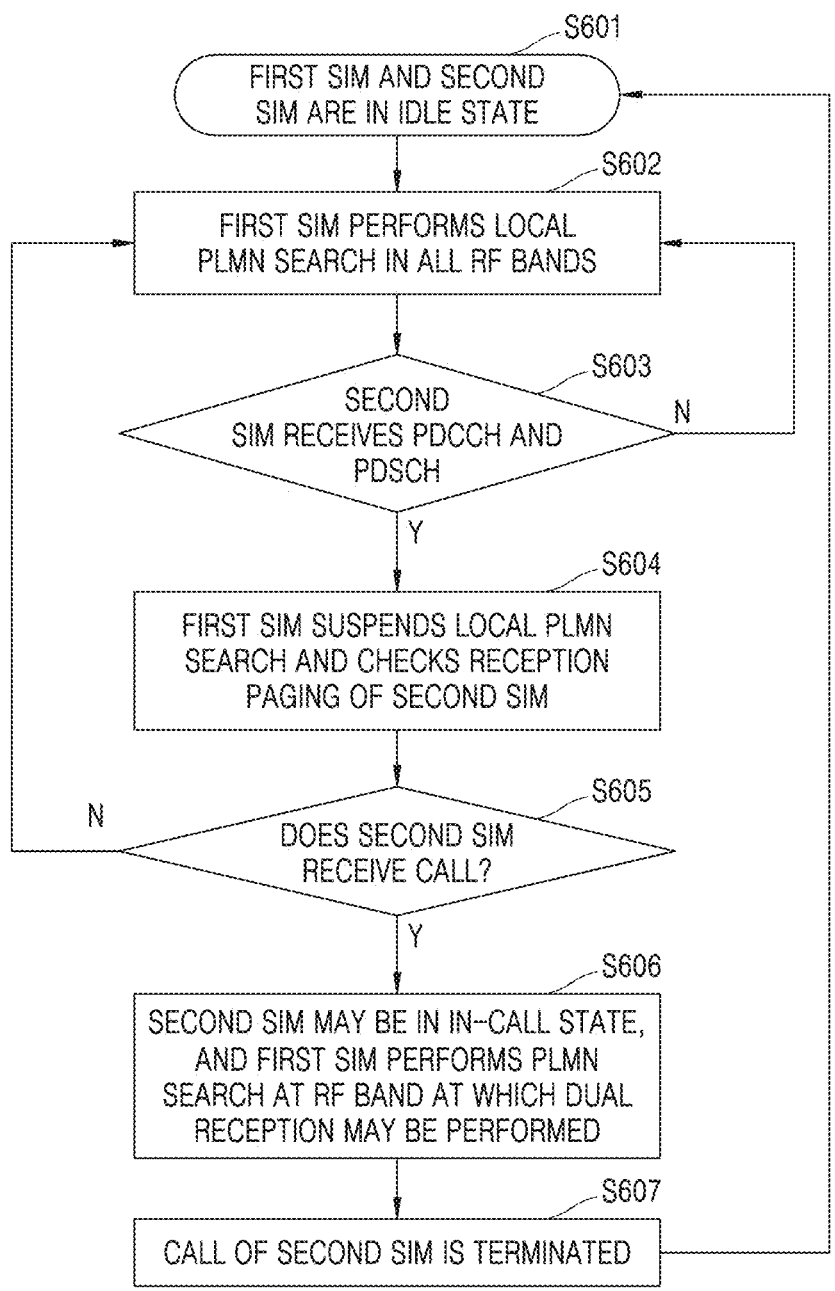
FIG. 5 illustrates an operation sequence of a wireless communication device according to embodiments.

FIG. 5 illustrates an operation sequence of a wireless communication device according to embodiments. FIG. 5 illustrates an operation procedure of a case where both of a first SIM and a second SIM according to embodiments of the present disclosure are in an idle state.

The first SIM 2010 may perform a Public Land Mobile Network (PLMN) search in the idle state. The PLMN search may refer to an operation of searching an available mobile network. In the present disclosure, the active call may refer to a state in which any one of a VoLTE call, a VoNR call, a VoWiFi call, and/or a VoMobile call is in an activated state, and the idle state may be referred to as a standby state in which the active call is finished and/or a new call may be sent or received. In operation S601, the first SIM (2010 of FIG. 2) and the second SIM (2020 of FIG. 2) may be in an idle state.

In operation S602, the first SIM 2010 may perform a local PLMN search in all RF bands. Both of the first SIM 2010 and the second SIM 2020 may be in an idle state, and the first SIM 2010 may suspend the PLMN search for a while in a paging section (e.g., paging time period/slot) of the second SIM 2020.

In operation S603, the second SIM 2020 may receive a physical downlink control channel (PDCCH) and a physical downlink shared channel (PDSCH) at PDCCH and PDSCH reception slots. When the second SIM 2020 does not receive (e.g., in response to a determination that the second SIM 2020 has not received) the PDCCH and the PDSCH at the PDCCH and PDSCH reception slots, the second SIM 2020 may return to operation S602.

In operation S604, when the second SIM 2020 receives PDCCH and PDSCH at the PDCCH and PDSCH reception slots (the case of Y), the first SIM 2010 may suspend the local PLMN search and may check reception paging of the second SIM 2020. Specifically, when the second SIM 2020 receives the PDCCH and the PDSCH, the first SIM 2010 may pause the PLMN search at a slot for receiving the PDCCH and the PDSCH. The first SIM 2010 may check reception paging.

In operation S605, it may be checked whether the second SIM 2020 receives a call (paging). When the second SIM 2020 does not receive a call (the case of N), the first SIM 2010 may restart the PLMN search in all RF bands. That is, the first SIM 2010 may return to operation S602.

In operation S606, when the second SIM 2020 receives a call (the case of Y), the second SIM 2020 may be in an in-call state in which a call is being performed. The first SIM 2010 may perform the PLMN search at an RF band at which dual reception Rx may be performed.

In operation S607, the call of the second SIM 2020 may be terminated. While the second SIM 2020 performs a call according to the procedure described above, the first SIM 2010 may not be suspended. That is, while the second SIM 2020 performs a call, the first SIM 2010 may perform RF measurement.

Figure 6:
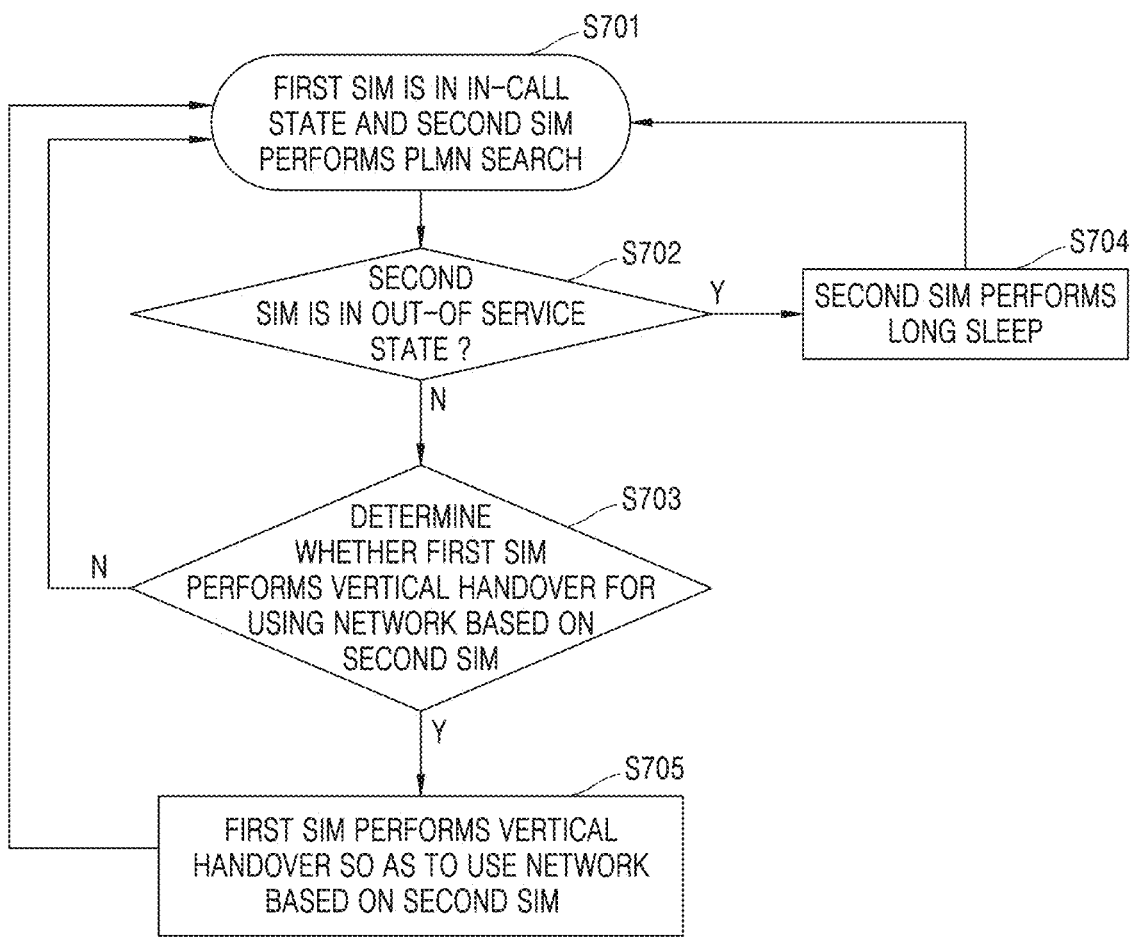
FIG. 6 illustrates an operation sequence of a wireless communication device according to embodiments.

FIG. 6 illustrates an operation sequence of a wireless communication device according to embodiments. FIG. 6 illustrates an operation procedure of a case where the first SIM is in an in-call or active state and the second SIM performs PLMN searching, according to embodiments of the present disclosure.

Referring to FIG. 6, in operation S701, the first SIM (2010 of FIG. 2) may be in an in-call state, e.g., a call active state, and the second SIM (2020 of FIG. 2) may perform the PLMN search. The second SIM may perform the PLMN search at an RF band at which dual reception may be performed.

In operation S702, the second SIM 2020 may also be in an out of service (OOS) state. Specifically, when the second SIM 2020 does not acquire a valid RF band through the PLMN search, the second SIM 2020 may be in an OOS state. For example, even when the second SIM 2020 performs the PLMN search at the RF band at which dual reception may be performed, the second SIM 2020 may not perform the PLMN search at an RF band affected by the RF band received by the first SIM 2010 so that the second SIM 2020 may be in an OOS state. When the second SIM 2020 is in an OOS state (e.g., in response to a determination that the second SIM 2020 is in an OOS state) (the case of Y), the second SIM 2020 may proceed to operation S704.

In operation S703, when the second SIM 2020 is not in the OOS state (the case of N), it may be determined whether the first SIM 2010 performs (e.g., is to perform, should perform, etc.) vertical handover for using a network based on the second SIM 2020. For example, the handover determination module to be described below with reference to FIG. 11 may determine whether the first SIM 2010 performs vertical handover for using a network based on the second SIM 2020. In a specific example, it may be determined whether the first SIM 2010 performs handover from VoLTE to VoMobile. When it is determined that the first SIM 2010 does not perform the vertical handover (the case of N), the first SIM 2010 may return to operation S701.

In operation S704, when the second SIM 2020 is in an OOS state (the case of Y), the second SIM 2020 may sleep (e.g., perform a longer sleep). For example, the second SIM 2020 may return to operation S701, and the second SIM 2020 may perform (e.g., re-perform) the PLMN search.

In operation S705, when it is determined that the first SIM 2010 performs vertical handover so as to use a network based on the second SIM 2020 (the case of Y), the first SIM may perform vertical handover so as to use a network based on the second SIM.

FIGS. 7A and 7B illustrate an example of combination of an RF band of a first SIM and a second SIM according to embodiments. In detail, FIGS. 7A and 7B illustrate examples of RF bands at which a wireless communication device may dual receive. The RF bands that may be dual-received by the wireless communication device of FIGS. 7A and 7B may be diversified according to an RF hardware (H/W) specification.

Referring to FIG. 7A, the first SIM may receive an RF band of a 5G stand alone (SA) network. For example, the first SIM may receive at least one RF band of n41 and/or n79 networks according to the 3GPP specification standard. The second SIM may receive an RF band of an LTE network. For example, the second SIM may receive at least one RF band of B3, B34, B39, B8, B38, B40, and/or B41 networks according to the 3GPP specification standards. The first SIM and the second SIM may operate as DR-DSDS based on the combination of the RF bands described above. For example, when the first SIM performs a call at the RF band of the first SIM described above, even when the second SIM performs the PLMN search of the RF band described above of the second SIM or call reception or user data reception within the band, interference between calls does not occur in the first SIM. For example, in FIG. 7A, 4RX may represent 4-channel reception.

Referring to the example of FIG. 7B, both of the first SIM and the second SIM may receive 5G SA RF bands. For example, each of the first SIM and the second SIM may receive at least one RF band of n28, n41, and/or n79 networks on the 3GPP specification standard. The first SIM and the second SIM may operate as DR-DSDS based on the combination of the RF bands described above. For example, when the first SIM performs a call at the RF band of the first SIM described above, even when the second SIM performs the PLMN search of the RF band of the second SIM described above, the second SIM may not be affected by interference between calls.

The combination of RF bands received by the first SIM and the second SIM is not limited to the examples described above, and cases thereof may be diversified. In the combination of the RF bands described above, even when the wireless communication device (200 of FIG. 2) is a device based on DSDS, the wireless communication device may operate as DR-DSDS.

Figure 7C:
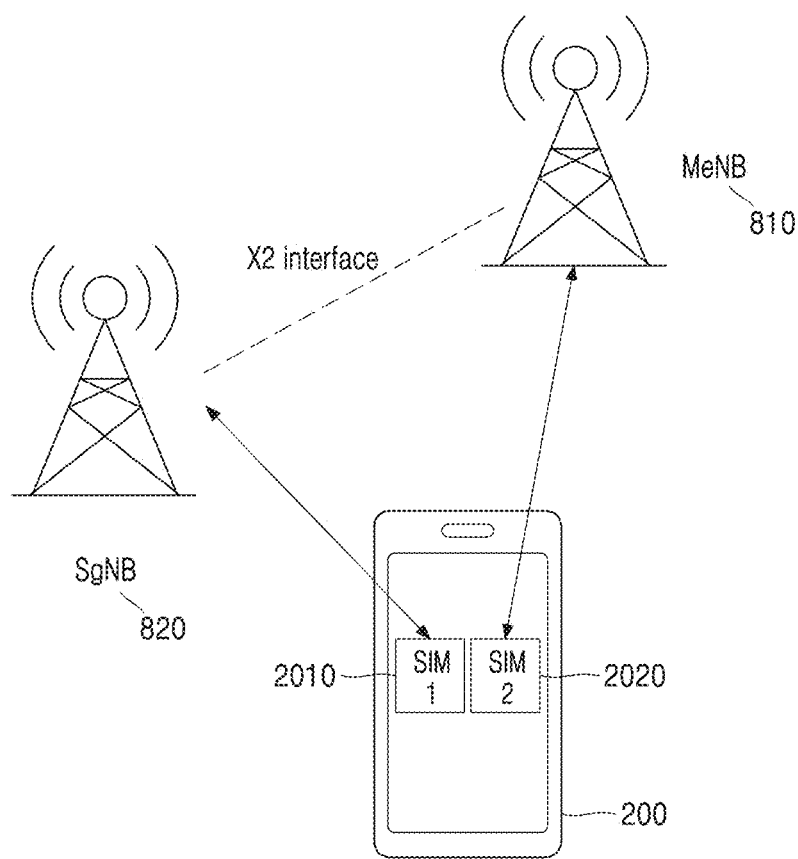
FIG. 7C illustrates an example of dual connectivity according to embodiments.

FIG. 7C illustrates an example of dual connectivity according to embodiments.

Dual connectivity (DC) may refer to technology in which one wireless communication device 200 is connected to two or more network points and receives a service. evolved universal terrestrial radio access (EUTRA)-NR Dual Connectivity (EN-DC) may refer to dual connectivity in which an LTE network has the architecture of a master cell and an NR network has the architecture of a secondary cell.

Referring to FIG. 7C, the wireless communication device 200 according to embodiments may communicate with a master eNB (MeNB) 810 and a secondary gNB (SgNB) 820 based on EN-DC. The wireless communication device 200 in which one SIM supports dual connectivity, may perform dual connectivity by dividing connection RATs for each SIM, for example. For example, the wireless communication device 200 may perform EN-DC in which the first SIM 2010 is connected to the SgNB 820 and the second SIM 2020 is connected to the MeNB 810. Thus, the wireless communication device 200 may operate as a DR-DSDS device. For example, the wireless communication device 200 based on DSDS may operate as a DRDS device by applying DC, as described above.

Figure 8:
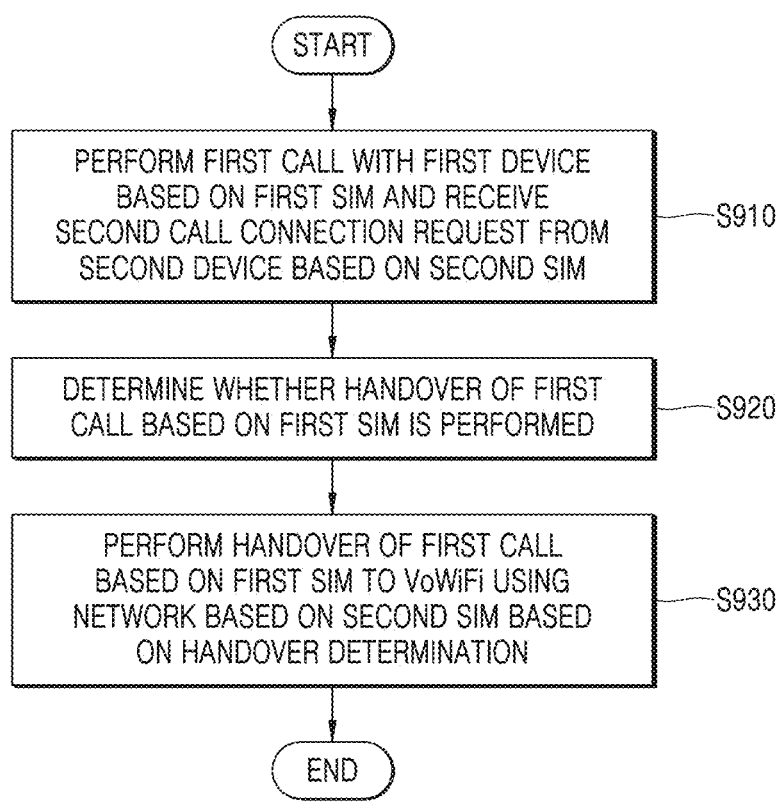
FIG. 8 illustrates an operation sequence of a wireless communication device according to embodiments.

FIG. 8 illustrates an operation sequence of a wireless communication device according to embodiments.

In operation S910, the wireless communication device (200 of FIG. 2) may perform a first call with a first device based on the first SIM (2010 of FIG. 2) and may receive a second call connection request from a second device based on the second SIM (2020 of FIG. 2).

In operation S920, the wireless communication device 200 may determine whether handover of a first call based on the first SIM 2010 is performed (e.g., is to be performed, should be performed, etc.). For example, the wireless communication device 200 may determine whether handover to the third RAT for the first call is performed. The wireless communication device 200 may determine whether handover is performed considering a user's selection (e.g., preference) of (e.g., via) the wireless communication device 200 and at least one of the state of the first RAT, the state of the second RAT, and/or the state of the third RAT.

The first RAT may include at least one of VoLTE and/or VoNR. The second RAT may include VoWiFi. The third RAT may include VoWiFi, e.g., VoMobile, using a network in which the first SIM uses a network based on a SIM different from the first SIM. For example, the wireless communication device 200 may determine whether the first SIM perform handover to the third RAT for the first call considering a user's selection (e.g., preference) of (e.g., via) the wireless communication device 200 and at least one of the state of the first RAT, the state of the second RAT, and the state of the third RAT.

The third RAT may use a core network based on the second SIM based on TCP/IP and IP sec tunneling. In an example, the third RAT may include a path including a network based on the second SIM, an ePDG based on (e.g., corresponding to) the first SIM, and a P-GW. In another example, the third RAT may have a path including a network based on the second SIM, N3IWF based on (e.g., corresponding to) the first SIM, and an UPF. According to embodiments, the ePDG corresponding to the first SIM may represent the ePDG through which the first SIM may form a a VoWiFi connection (e.g., in the second RAT and/or the third RAT). According to embodiments, the N3IWF corresponding to the first SIM may represent the N3IWF through which the first SIM may form a VoWiFi connection (e.g., in the third RAT).

In operation S930, the wireless communication device 200 may perform handover of the first call based on the first SIM 2010 to VoWiFi using the network based on the second SIM 2020 based on determination of handover. For example, when it is determined that the first SIM 2010 performs the handover, the first SIM 2010 may handover the first call to the third RAT based on the determination. The wireless communication device 200 may perform the second call and the handover first call.

When it is determined that the first SIM 2010 does not perform the handover, it may be determined whether the second SIM performs handover to the third RAT. When it is determined that the second SIM 2020 performs handover to the third RAT, the wireless communication device 200 may enable the second SIM 2020 to handover the second call to the third RAT based on determination of the second SIM 2020. The wireless communication device 200 may simultaneously (or contemporaneously) perform the first call and the handover second call in one stack (e.g., through one RAT).

Figure 9:
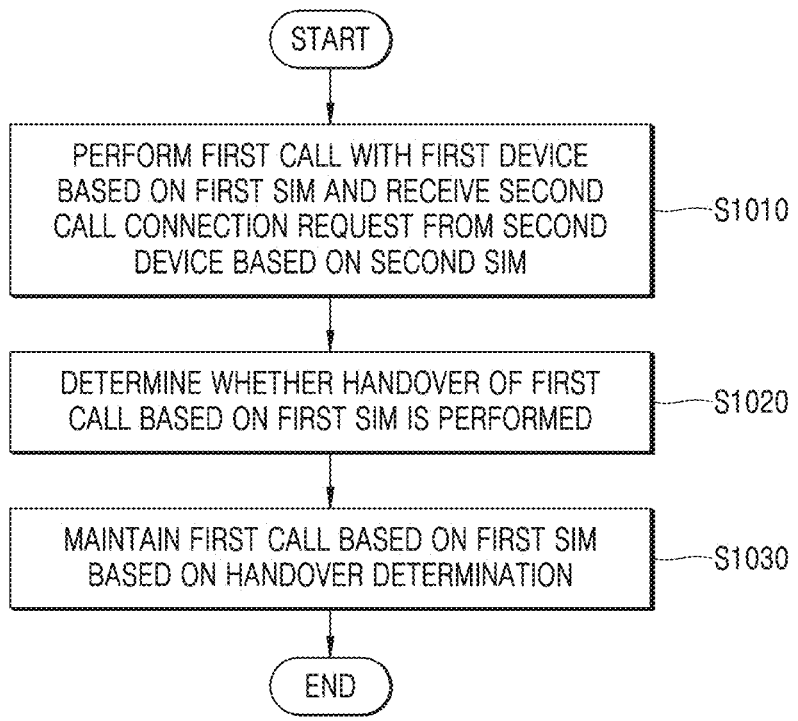
FIG. 9 illustrates an operation sequence of a wireless communication device according to embodiments.

FIG. 9 illustrates an operation sequence of a wireless communication device according to embodiments.

In operation S1010, the wireless communication device (200 of FIG. 2) may perform a first call with a first device based on the first SIM (2010 of FIG. 2) and may receive a second call connection request from a second device based on the second SIM (2020 of FIG. 2). For example, the first SIM may perform a first call with the first device based on the third RAT. The second SIM may receive a second call connection request from the second device based on the first RAT.

In operation S1020, the wireless communication device 200 may determine whether handover of the first call based on the first SIM 2010 is performed (e.g., is to be performed, should be performed, etc.). For example, the wireless communication device 200 may determine to maintain the third RAT for the first call based on the first SIM 2010.

In operation S1030, the wireless communication device 200 may maintain the first call based on the first SIM 2010 based on the determination of handover (e.g., determination in operation S1020).

Figure 10:
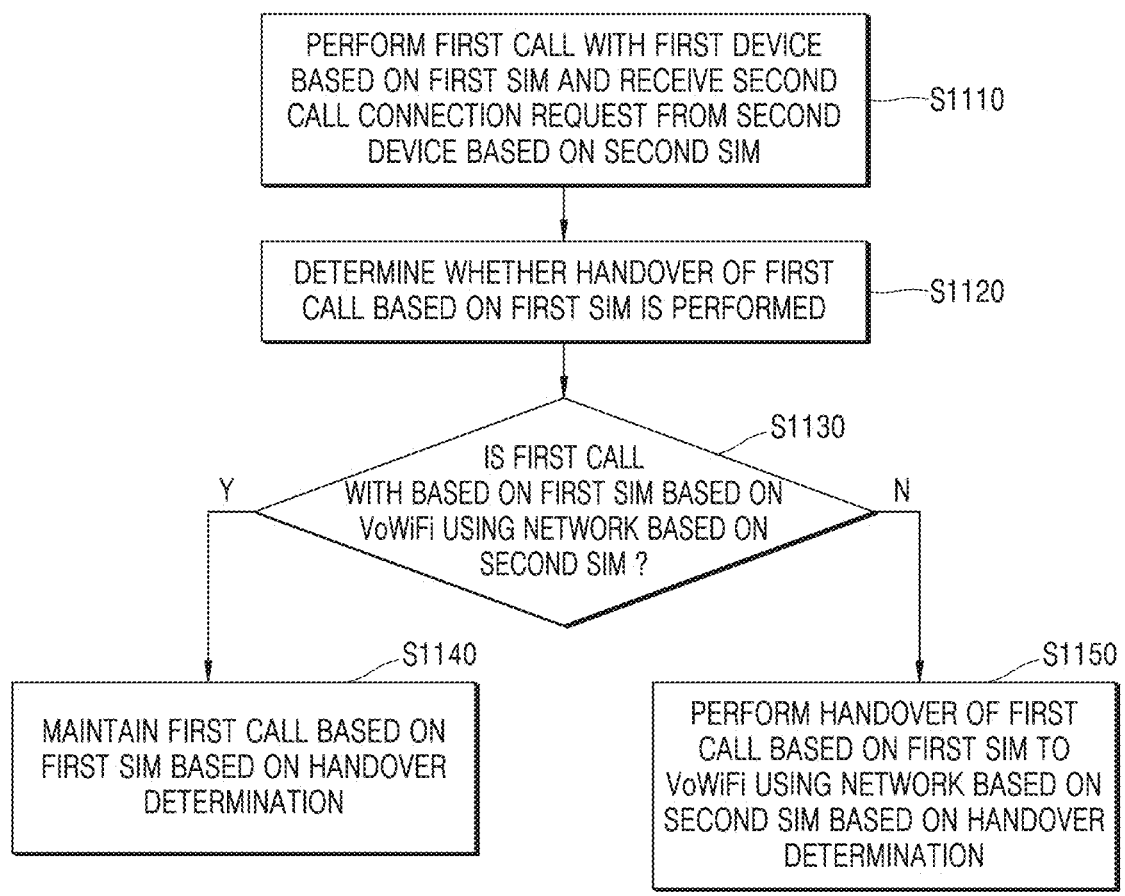
FIG. 10 illustrates an operation sequence of a wireless communication device according to embodiments.

FIG. 10 illustrates an operation sequence of a wireless communication device according to embodiments.

In operation S1110, the wireless communication device (200 of FIG. 2) may perform a first call with a first device based on the first SIM (2010 of FIG. 2) and may receive a second call connection request from a second device based on the second SIM (2020 of FIG. 2).

In operation S1120, the wireless communication device 200 may determine whether handover of the first call based on the first SIM 2010 is performed (e.g., is to be performed, should be performed, etc.).

In operation S1130, the wireless communication device 200 may check whether the first call based on the first SIM 2010 is based on VoWiFi using the network based on the second SIM 2020 (e.g., the third RAT).

In operation S1140, when the first call based on the first SIM 2010 is based on VoWiFi using the network based on the second SIM 2020, the wireless communication device 200 may maintain the first call based on the first SIM based on determination of handover (e.g., determination in operation S1120).

In operation S1150, when the first call based on the first SIM 2010 is not based on VoWiFi using the network based on the second SIM 2020 (the case of N), the wireless communication device 200 may handover the first call based on the first SIM 2010 to VoWiFi using the network based on the second SIM 2020 based on determination of handover (e.g., determination in operation S1120).

Figure 11:
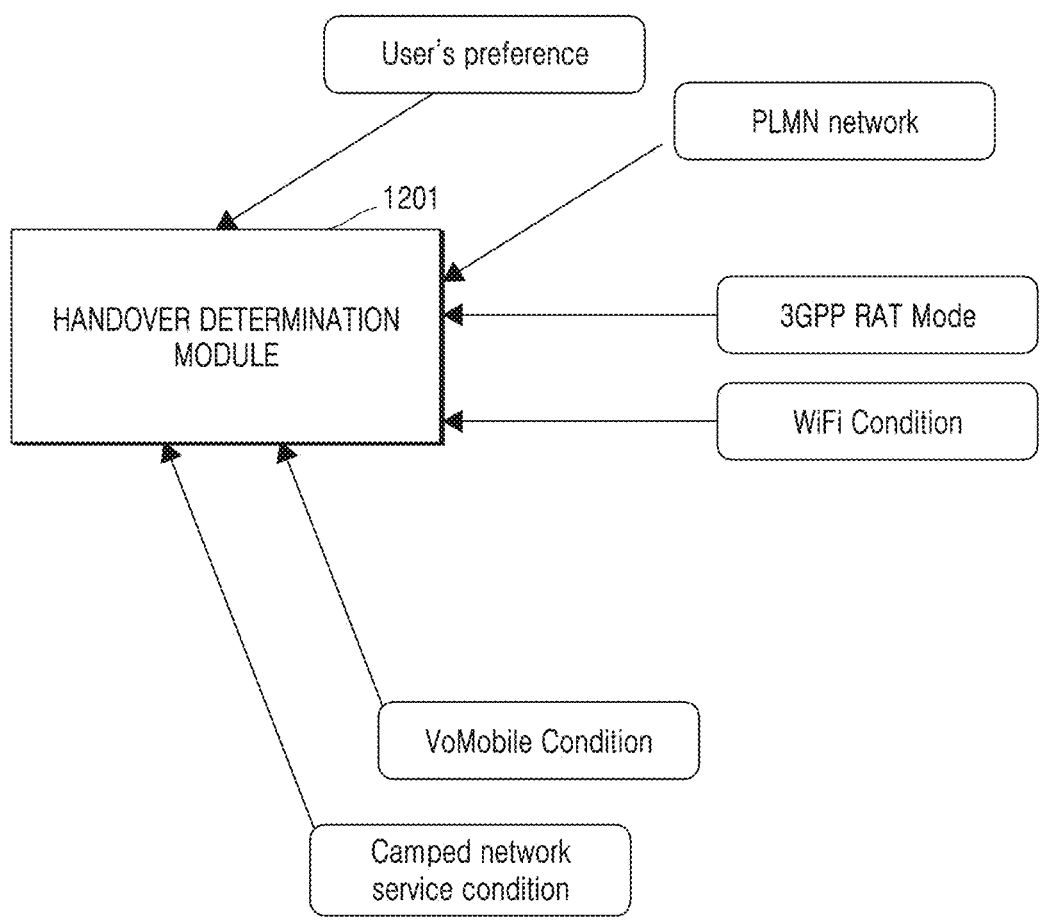
FIG. 11 illustrates a handover determination module according to embodiments.

FIG. 11 illustrates a handover determination module according to embodiments.

As described above, the handover determination module 1201 may be referred to as a service quality monitor (SQM). Handover may include handover in an idle state and/or handover in a call state. Handover in the idle state may be referred to as RAT reselection. According to embodiments, the handover determination module 1201 may be included in the wireless communication device (200 of FIG. 2).

The handover determination module 1201 may determine handover for at least one of the first SIM (2010 of FIG. 2) and/or the second SIM (2020 of FIG. 2). For example, the handover determination module 1201 may monitor service quality of at least one of the first SIM 2010 and/or the second SIM 2020. The handover determination module 1201 may measure all RF bands and may measure RAT states. The handover determination module 1201 may check the connection state of PS data and IMS service availability. The handover determination module 1201 may perform the above-described operations based on the following parameters.

The handover determination module 1201 may operate considering at least one of a user's selection (e.g., preference), a PLMN network, a 3GPP RAT mode, a WiFi condition, a VoMobile condition, and/or a camped network service condition. For example, the handover determination module 1201 may not be connected to the PLMN network that does not correspond to the wireless communication device (200 of FIG. 2) and may check whether roaming is performed. The handover determination module 1201 may consider whether the connected network is an LTE network or an NR network in relation to the 3GPP RAT mode. The handover determination module 1201 may consider the intensity of a VoWiFi signal in relation to the VoWiFi condition. The handover determination module 1201 may consider whether VoMobile is allowed, in relation to the VoWiFi condition. The handover determination module 1201 may consider whether at least one of VoLTE, VoNR and/or VoWiFi is supported, in relation to the camped network service condition.

In addition, the handover determination module 1201 may operate considering at least one of a handover direction, a reference signal received power (RSRP), a received signal strength indicator (RSSI), a reference signal received quality (RSRQ), an IMS service status from a network registration message, the state of the first RAT, the state of the second RAT, and/or the state of the third RAT.

The state of the first RAT may include at least one of RSRP, RSSI, and/or RSRQ of the first RAT. The state of the second RAT may include at least one of RSRP, RSSI, and/or RSRQ of the second RAT. The state of the third RAT may include at least one of RSRP, RSSI, and/or RSRQ of the third RAT.

The handover direction may refer to the direction of the handover cycle of FIG. 4.

Figure 12:
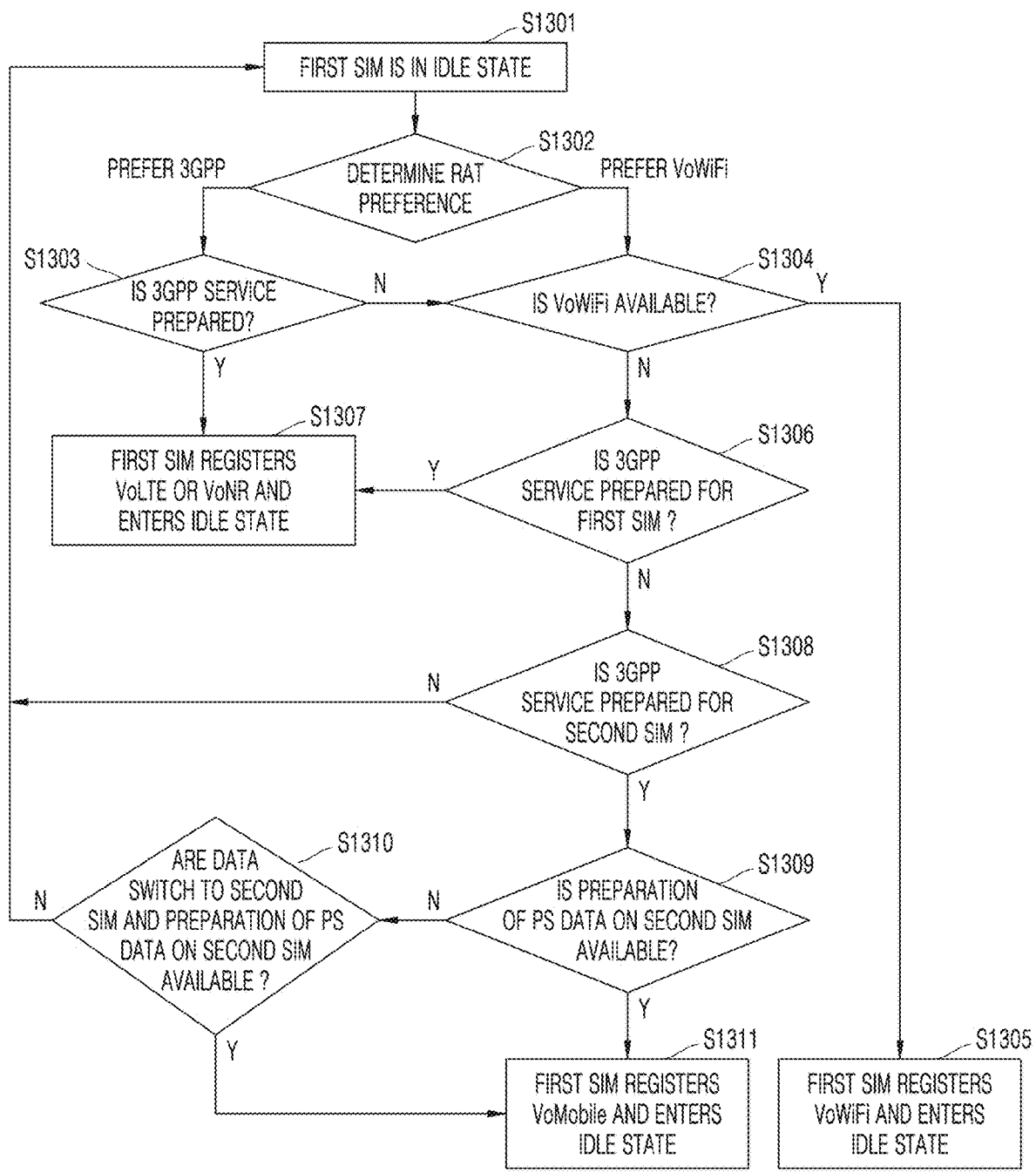
FIG. 12 illustrates an operation of a wireless communication device according to embodiments.

FIG. 12 illustrates an operation of a wireless communication device according to embodiments. In detail, FIG. 12 illustrates an operation procedure in which a wireless communication device performs handover in an idle state. FIG. 12 illustrates a procedure in which the wireless communication device performs reselection in the idle state for IMS service registration.

In operation S1301, the first SIM may be in an idle state. In operation S1302, the first SIM may determine RAT selection, or preference, (e.g., from among 3GPP and VoWiFi). According to embodiments, the RAT preference as discussed herein may refer to a RAT selection. In operation S1303, when the first SIM prefers 3GPP, it may be checked whether a 3GPP RAT service is prepared. In operation S1303, when the 3GPP service is not prepared (the case of N), the method may advance to operation S1304.

In operation S1304, when the first SIM prefers VoWiFi, the first SIM may check whether VoWiFi is available. In operation S1305, when VoWiFi is available, the first SIM may register VoWiFi and may enter the idle state. In operation S1306, when VoWiFi is not available, the wireless communication device may check whether a 3GPP service for the first SIM is prepared.

In operation S1307, when the 3GPP service is prepared (the case of Y) (e.g., available, in service, etc.), the first SIM may register VoLTE or VoNR and may enter the idle state.

In operation S1308, when the 3GPP service is not prepared for the first SIM (the case of N), the wireless communication device may check whether the 3GPP service is prepared (e.g., available, in service, etc.) for the second SIM. Thus, the first SIM may attempt a VoMobile service through the second SIM. When the 3GPP service is not prepared for the second SIM, the first SIM may return to operation S1301. Because the second SIM is in an OOS condition, the second SIM may start from operation S1301 after waking from a sleep mode.

In operation S1309, when the 3GPP service is prepared for the second SIM (the case of Y), the wireless communication device may check whether PS data may be prepared on the second SIM. In operation S1310, when the PS data is not prepared on the second SIM, the wireless communication device may check whether data switch to the second SIM and preparation of PS data on the second SIM are available. The second SIM may return to operation S1301 when data switch and the PS data are not available. Because the second SIM is in an OOS condition, the second SIM may start from operation S1301 after waking from the sleep mode.

In operation S1311, when PS user data reception or data switch is available on the second SIM, the first SIM may register VoMobile on this path and may enter the idle state. That is, when the PS user data may be prepared for VoMobile in the second SIM or the wireless communication device sets up an Internet PDN in the second SIM automatically, the first SIM may be registered on the VoMobile of the second SIM.

Figure 13:
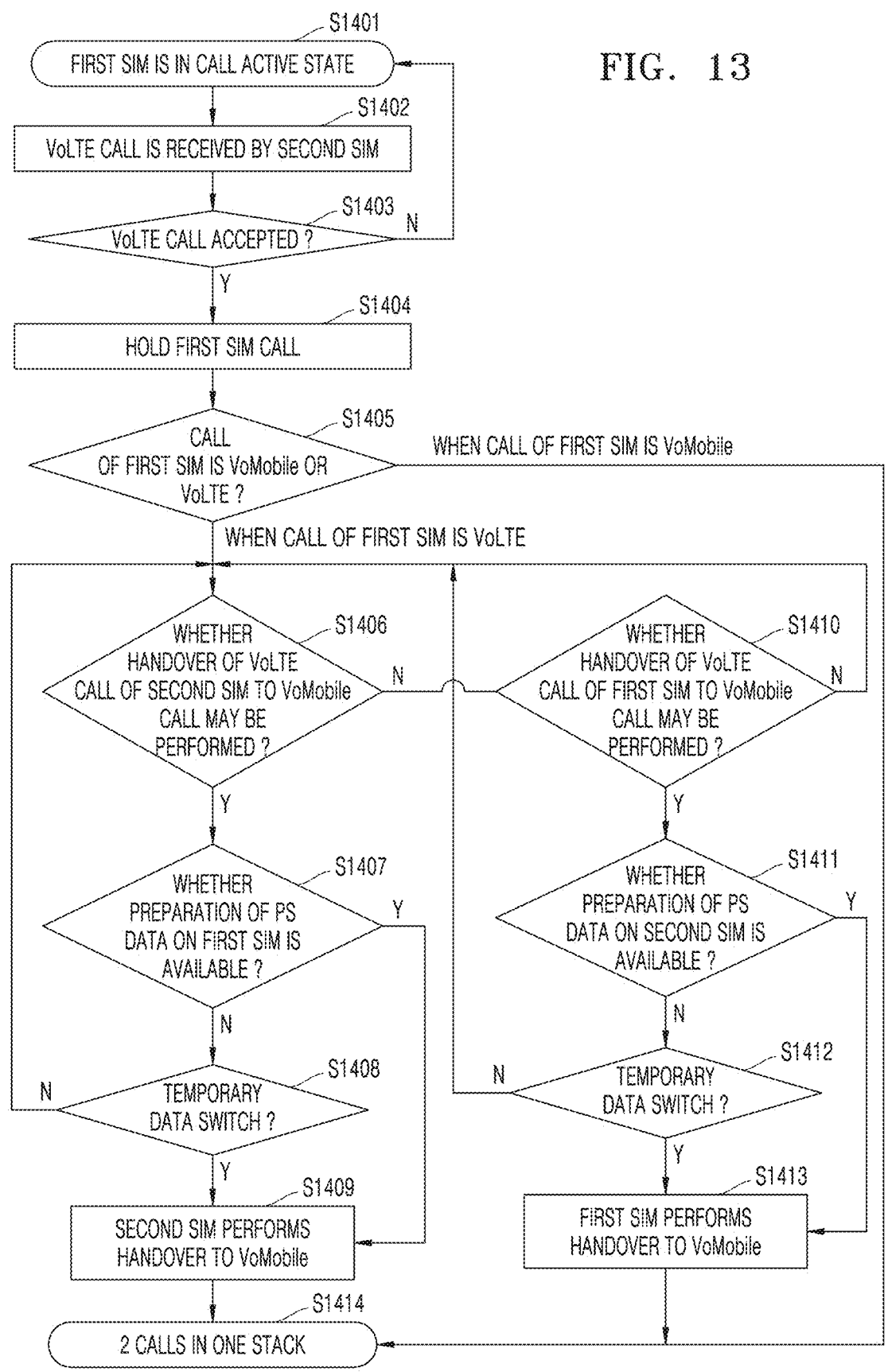
FIG. 13 illustrates an operation of a wireless communication device according to embodiments.

FIG. 13 illustrates an operation of a wireless communication device according to embodiments. In detail, FIG. 13 illustrates an example of a handover operation procedure when a call for the first SIM (2010 of FIG. 2) is an active call and a call for the second SIM (2020 of FIG. 2) is a VoLTE call.

In operation S1401, the first SIM 2010 may be in a call active state.

In operation S1402, the VoLTE call may be received by the second SIM 2020. In operation S1403, the wireless communication device may determine whether the VoLTE call has been accepted. For example, the user may reject the call of the second SIM 2020. When the user rejects the call of the second SIM 2020, the wireless communication device may return to operation S1401.

In operation S1404 (the case of Y), a call paged in the second SIM 2020 may be accepted as an active call, and a call of the first SIM 2010 may be changed into a hold state.

In operation S1405, the wireless communication device may check whether the call of the first SIM 2010 is VoMobile or VoLTE. When the call of the first SIM 2010 is VoLTE, the wireless communication device may proceed to operation S1406. When the call of the first SIM is VoMobile, the wireless communication device may proceed to operation S1414. That is, when the first SIM 2010 is in a VoMobile state and the VoLTE call is received by the second SIM 2020, two calls may be collected in the second SIM 2020.

In operation S1406, the wireless communication device may determine whether handover of the VoLTE call of the second SIM 2020 to the VoMobile call may be performed. When the wireless communication device may not handover the VoLTE call of the second SIM 2020 to the VoMobile call (the case of N), the wireless communication device may proceed to operation S1410.

In operation S1407, when the wireless communication device may handover the VoLTE call of the second SIM 2020 to the VoMobile call (the case of Y), the wireless communication device may check whether PS data preparation on the first SIM 2010 is available. The wireless communication device may proceed to operation S1409 when PS data preparation on the first SIM 2010 is available.

In operation S1408, the wireless communication device may determine whether performance of temporary data switch to the first SIM 2010 is available when PS data preparation on the first SIM 2010 is not available. Thus, the wireless communication device may enable PS data preparation on the first SIM 2010. When the wireless communication device may not perform temporary data switch to the first SIM 2010, the wireless communication device may return to operation S1406.

When temporary data switch is performed, the wireless communication device may proceed to operation S1409. In operation S1409, the second SIM 2020 may perform handover to the VoMobile call. Thus, all of two calls may simultaneously (or contemporaneously) operate in a stack of the first SIM 2010 in operation S1414.

In operation S1410, when the wireless communication device may not handover the VoLTE call of the second SIM 2020 to the VoMobile call (the case of N in operation S1406), it may be determined whether handover of the VoLTE call of the first SIM 2010 to the VoMobile call may be performed.

In operation S1411, when the wireless communication device may perform handover of the call of the first SIM 2010 to the VoMobile call, it may be checked whether PS data preparation on the second SIM 2020 is available. The wireless communication device may proceed to operation S1413 when PS data preparation on the second SIM 2020 is available.

In operation S1412, the wireless communication device may determine whether performance of temporary data switch to the second SIM 2020 is available when PS data preparation on the second SIM 2020 is not available. Thus, the wireless communication device may enable PS data preparation on the second SIM 2020. When the wireless communication device may not perform temporary data switch to the second SIM 2020, the wireless communication device may return to operation S1406. In one example, operations S1410 to operation S1413 may be performed prior to operations S1406 to operation S1409, that is, the wireless communication device may determine whether the handover of the VoLTE call of the first SIM 2010 to the VoMobile call may be performed before determining whether the handover of the VoLTE call of the second SIM 2020 to the VoMobile call may be performed.

When temporary data switch is performed, the wireless communication device may proceed to operation S1413. In operation 1413, the first SIM 2010 may perform handover to the VoMobile call. That is, both of two calls may operate in a stack of the second SIM 2020. As a result, in operation S1414, two calls may be collected in a stack of one SIM. Thus, interference between stacks may be reduced.

Figure 14:
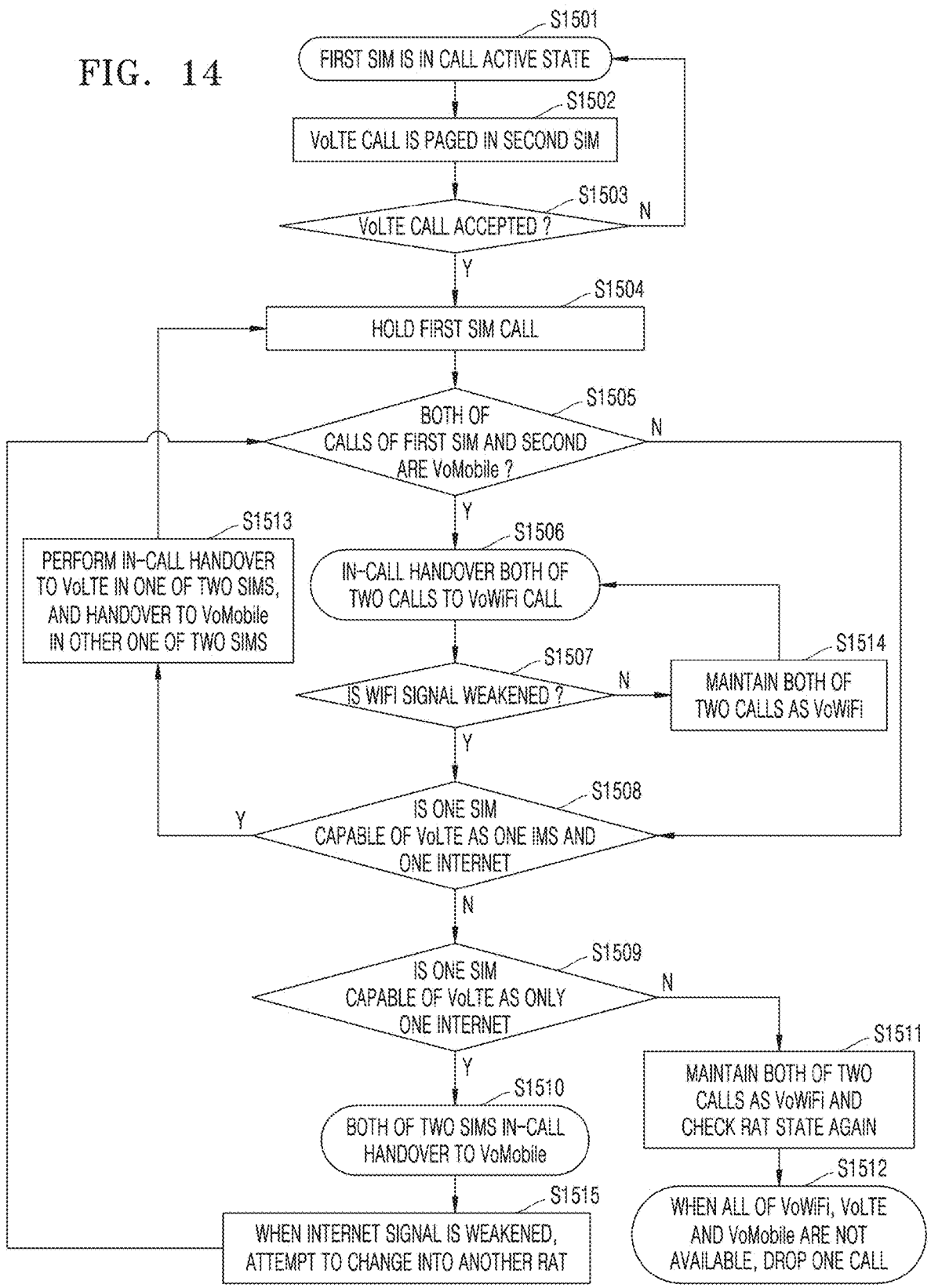
FIG. 14 illustrates an operation of a wireless communication device according to embodiments.

FIG. 14 illustrates an operation of a wireless communication device according to embodiments. In detail, FIG. 14 illustrates an example of a handover operation procedure when the call for first SIM (2010 of FIG. 2) is an active call and a reception call for the second SIM (2020 of FIG. 2) is a VoLTE call.

In operation S1501, the first SIM 2010 may be in a call active state.

In operation S1502, the VoLTE call may be paged by the second SIM 2020.

In operation S1503, the wireless communication device may determine whether the call paged in the second SIM 2020 has been accepted. For example, the second SIM 2020 may reject the call. When the second SIM 2020 rejects the call, the wireless communication device may return to operation S1501.

In operation S1504, a call paged in the second SIM 2020 may be accepted as an active call, and a call paged in the first SIM 2010 may be changed into a hold state.

In operation S1505, the wireless communication device may check whether VoWiFi is available in both of the first SIM 2010 and the second SIM 2020. When VoWiFi is not available in any one of the first SIM 2010 and the second SIM 2020 (the case of N), the wireless communication device may proceed to operation S1508.

In operation S1506, when VoWiFi is available in both of the first SIM and the second SIM (the case of Y), in-call handover of two calls to a VoWiFi call may be performed.

In operation S1507, the wireless communication device may check whether a WiFi signal is weakened. When the WiFi signal is not weakened (the case of N), the wireless communication device may proceed to operation S1514.

In operation S1508, when the WiFi signal is weakened (the case of Y), the wireless communication device may check whether one SIM is capable of VoLTE as one IMS and one Internet. When one SIM is capable of VoLTE as one IMS and one Internet (the case of YES), the wireless communication device may proceed to operation S1513.

In operation S1509, when one SIM is not capable of VoLTE as one IMS and one Internet (the case of NO), the wireless communication device may check whether one SIM is capable of VoLTE as only one Internet. When one SIM is not capable of VoLTE as only one Internet (the case of NO), the wireless communication device may proceed to operation S1511.

In operation S1510, when one SIM is capable of VoLTE as only one Internet (the case of Y), in-call handover may be performed to VoMobile in both of the two SIMs (the first SIM 2010 and the second SIM 2020).

In operation S1511, the wireless communication device may maintain both of two calls as VoWiFi and may check the RAT condition again.

In operation S1512, the wireless communication device may drop one call when all of VoWiFi, VoLTE and VoMobile is not available.

In operation S1513, in-call handover to VoLTE may be performed in one of two SIMs, and handover to VoMobile may be performed in the other one of two SIMs.

In operation S1514, the wireless communication device may maintain both of two calls to VoWiFi.

In operation S1515, the wireless communication device may attempt to change into another RAT when an Internet signal is weakened. For example, the wireless communication device may check whether both of the two calls are capable of VoWiFi (operation S1505).

The examples described above has been described based on VoLTE among 3GPP networks, however, the present disclosure is not limited to the examples described above and may be applied to VoNR, etc.

Figure 15A:
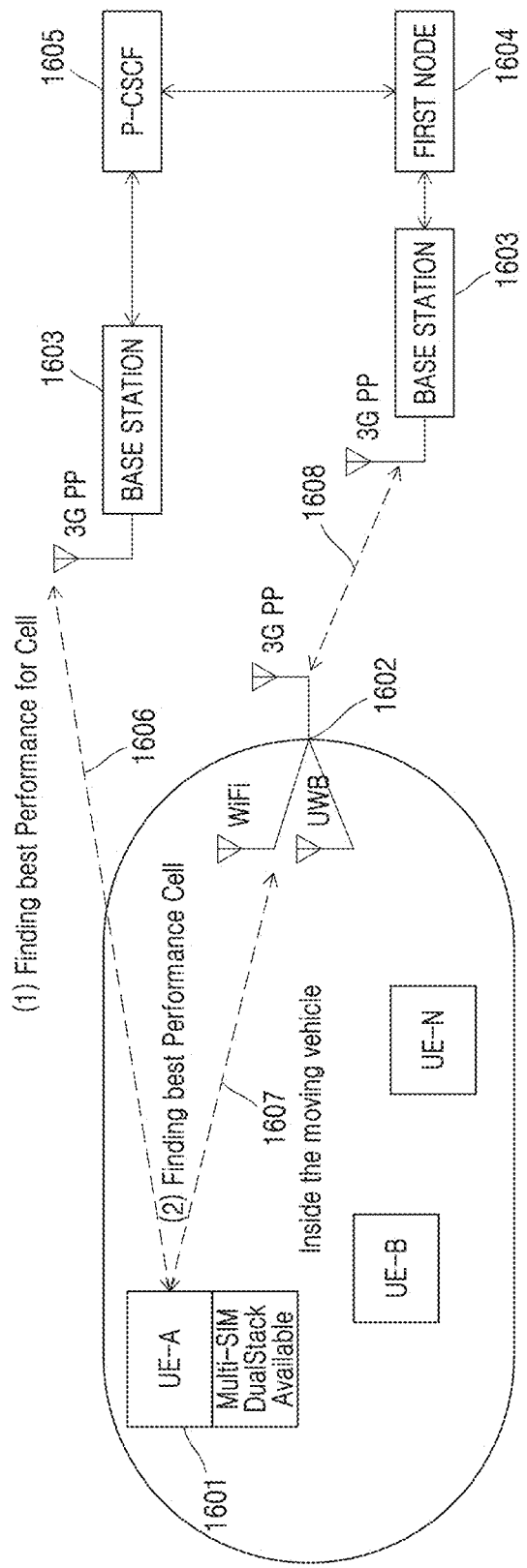
FIGS. 15A and 15B illustrate embodiments of a wireless connection method.
Figure 15B:
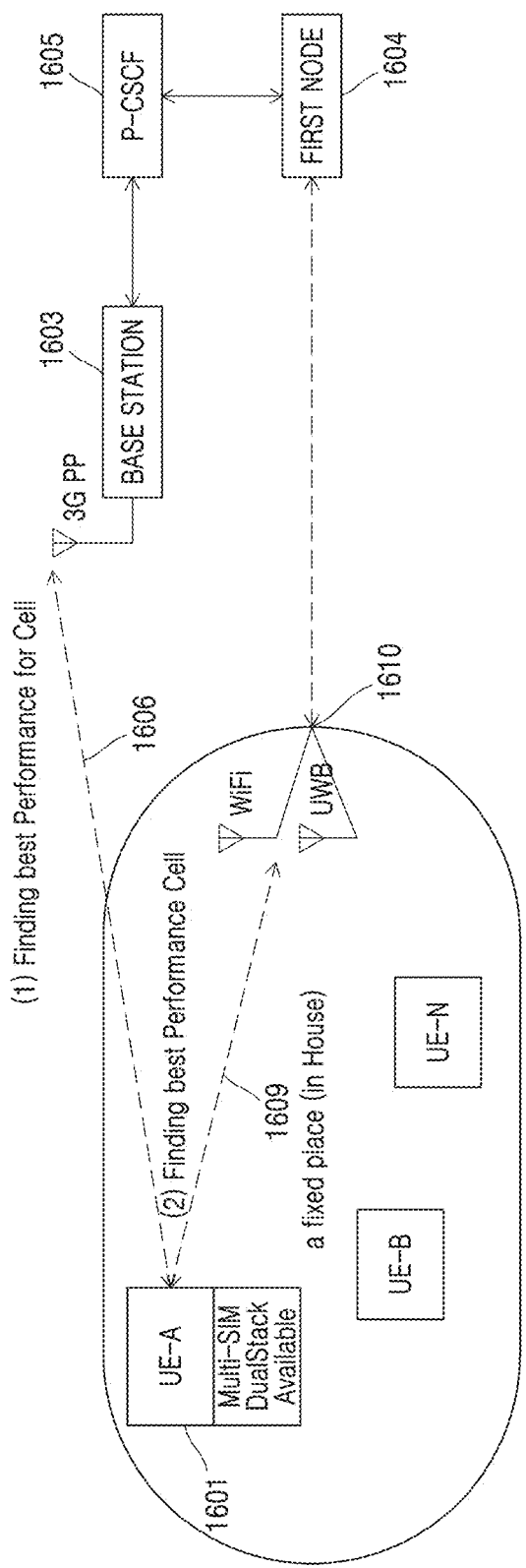

FIGS. 15A and 15B illustrate embodiments of a wireless connection method.

Referring to FIG. 15A, a wireless communication system may include a plurality of terminals such as UE-A 1601, UE-B, . . . , and UE-N(where N may be an integer greater than or equal to 3). The UE-A 1601 may have one or more SIM (e.g., two SIMs) and dual stacks. A base station 1603 may refer to one of eNB and/or gNB. A first node 1604 may refer to one of ePDG and/or N3IWF. The UE-A 1601 may be directly connected to the base station 1603. The UE-A 1601 may be connected to the base station 1603 via a movable spot 1602 (e.g., a movable wireless hotspot). In detail, as one example of vehicle to everything (V2X), the UE-A 1601 may be connected to the movable spot 1602 through a wireless local area network (WLAN) connection 1607, and the movable spot 1602 may be connected to the base station 1603 through a connection 1608.

Referring to FIG. 15B, the UE-A 1601 may be WLAN connected (1609) to indoor Wi-Fi or an ultra wide band (UWB) access point (AP) 1610. The AP 1610 may be connected to the base station 1603.

VoWiFi, VoLTE, and VoMobile described in the present disclosure may be applied to PS data services based on the above-described connections. In addition, embodiments of the present disclosure may be applied to a service following streaming data as a kind of a service following a real-time transport protocol (RTP) data flow for a call.

Figure 16:
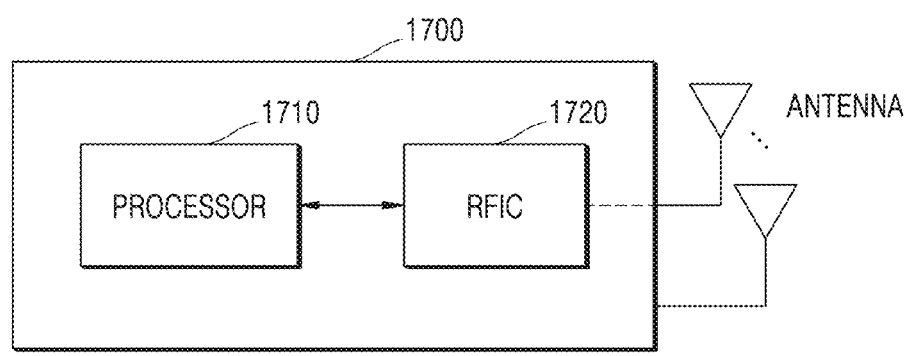
FIG. 16 is a block diagram illustrating user equipment (UE) according to embodiments.

FIG. 16 is a block diagram illustrating UE according to embodiments.

Referring to FIG. 16, a UE 1700 may include one or more processors 1710 and one or more RFICs 1720. The processor 1710 may control the RFIC 1720 and may be configured to implement an operating method of the UE 1700 and operating flowcharts. The UE 1700 may include a plurality of antennas, and the RFIC 1720 may transmit/receive a wireless signal through one or more antennas. At least portions of the plurality of antennas may correspond to a transmission antenna. The transmission antenna may transmit a wireless signal to an external device (e.g., other UE or a base station (BS) that is not the UE 1700). At least portions of the plurality of antennas may correspond to a reception antenna. The reception antenna may receive the wireless signal from the external device.

According to embodiments, the UE 1700 may be an example of the wireless communication device 200 of FIG. 2. In an example, the UE 1700 may include a first SIM, a second SIM, a processor for controlling the first SIM to perform a first call with a first device based on the first SIM, and an RFIC for receiving a second call connection request from a second device based on the second SIM. The processor 1710 may control the first SIM to determine whether handover of the first call based on the first SIM to one of a first radio access technology (RAT), a second RAT, and a third RAT. The first RAT may include at least one of VoLTE and VoNR, and the second RAT may include VoWiFi, and the third RAT may include VoWiFi using a network based on the second SIM. The processor 1710 may control the first call based on the first SIM to be handover to the third RAT based on the determination. The processor 1710 may control the first SIM and the second SIM to perform the handover first call and the second call.

Figure 17:
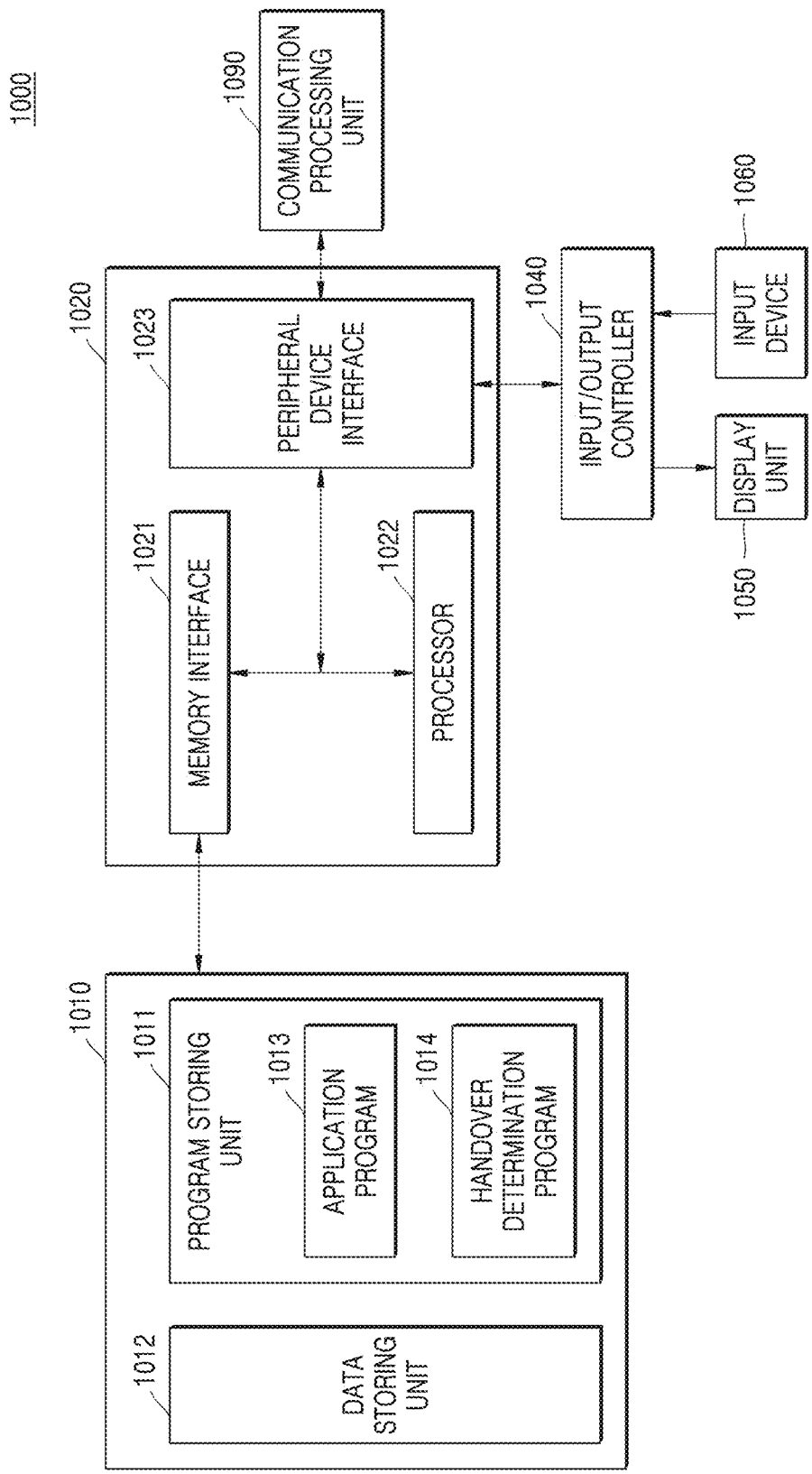
FIG. 17 is a block diagram illustrating an electronic device according to embodiments.

FIG. 17 is a block diagram illustrating an electronic device 1000 according to embodiments. Referring to FIG. 17, an electronic device 1000 may include a memory 1010, a processor unit 1020, an input/output controller 1040, a display unit 1050, an input device 1060, and/or a communication processing unit 1090. Here, there may be a plurality of memories 1010. Each component will be described as below. According to embodiments, the electronic device 1000 may be an example of the wireless communication device 200 of FIG. 2. The processor unit 1020 may include a memory interface 1021, a processor 1022 and/or a peripheral device interface 1023.

The memory 1010 may include a program storing unit 1011 for storing a program for controlling the operation of the electronic device and a data storing unit 1012 for storing data generated during the execution of the program. The data storing unit 1012 may store data for operations of an application program 1013 and a handover determination program 1014. The program storing unit 1011 may include the application program 1013 and the handover determination program 1014. Here, the program included in the program storing unit 1011 may be a set of instructions and may also be represented as an instruction set.

The application program 1013 may include an application program that operates in the electronic device. That is, the application program 1013 may include instructions of an application driven by the processor 1022. The handover determination program 1014 may determine handover considering at least one of a handover direction, a reference signal received power (RSRP), a received signal strength indicator (RSSI), a reference signal received quality (RSRQ), an IMS service status from a network registration message, the state of the first RAT, the state of the second RAT, and/or the state of the third RAT.

The peripheral device interface 1023 may control a connection between an input/output peripheral device of a base station and the processor 1022 and the memory interface 1021. The processor 1022 may control the base station to provide a corresponding service by using at least one software program. In this case, the processor 1022 may provide a service corresponding to a corresponding program by executing at least one program stored in the memory 1010.

The input/output controller 1040 may provide an interface between the input/output device, such as the display unit 1050 and the input device 1060, and the peripheral device interface 1023. The display unit 1050 may display state information, an input character, a moving picture, and/or a still picture. For example, the display unit 1050 may display application program information driven by the processor 1022.

The input device 1060 may provide input data generated by selection of the electronic device to the processor unit 1020 via the input/output controller 1040. In this case, the input device 1060 may include a keypad including at least one hardware button and a touch pad for detecting touch information. For example, the input device 1060 may provide the touch information such as touch, touch movement, touch release, etc. detected by the touch pad to the processor 1022 via the input/output controller 1040. The electronic device 1000 may include a communication processing unit 1090 that performs a communication function for voice communication and data communication.

Conventional devices for multi-SIM wireless communications are only able to maintain an active call on one SIM over a given period. For example, if a conventional device receives a call on one SIM during an ongoing call on another SIM, the conventional device drops or holds one of the two calls. A call placed on hold is dropped after a relatively brief period of time. Accordingly, the conventional devices are unable to maintain two active calls over different SIMs.

However, according to embodiments, improved devices and methods are provided for multi-SIM wireless communications. For example, in the event a new call is received on a first SIM while an ongoing call is maintained on a second SIM, the improved devices and methods may perform both calls through a mobile network connection of one of the two SIMs. For instance, the improved devices and methods may cause the call of one of the SIMs (e.g., the second SIM) to be reconnected via a VoWiFi connection (e.g., VoMobile) through a mobile network connection of the other of the two SIMs (e.g., the first SIM) while the other SIM (e.g., the first SIM) also uses the mobile network connection to perform a call (e.g., VoLTE, VoNR, VoWiFi, VoMobile, etc.). Accordingly, the improved devices and methods overcome the deficiencies of the conventional devices to at least maintain two active calls over different SIMs.

According to embodiments, operations described herein as being performed by the wireless communication system 10, the wireless communication device 100, the first network 210, the second network 220, the RFIC 120, the multi-SIM device 130, the first SIM 2010, the second SIM 2020, the m$^{th}$ SIM 2030, the wireless communication device 200, the first stack 2040, the second stack 2050, the second SIM array 2022, the eSIM 2021, the first SIP function 2041, the first TCP/IP 2042, the first PDCP MUX 2043, the second SIP function 2051, the second TCP/IP 2052, the second PDCP MUX 2053, the Telephony Framework layer 2032; the packet router 2034, a TCP/IP 2035, the WiFi module 2061, the first receiver Rx1 2071, the first transmitter Tx1 2073, the second receiver Rx1 2072, the Application Framework & Ux Layer 2031, the Radio Interface Layer (RIL)/Kernel Layer 2033, the transmitter/receiver 2070, the second transmitter 2074, the first SIM/stack 310, the second SIM/stack 320, the TCP/IP 330, the first LTE/NR connection 311, the first Wi-Fi connection 312a, the second LTE/NR connection 321, the eNB 341, the AP 350a, the S-GW 342, the ePDG 351, the P-GW 343, the first IMS network 344, the eNB 361, the S-GW 362, the P-GW 363, the second Wi-Fi connection 312b, the AP 350b, the gNB 366, the AMF 367, the N3IWF 351b, the UPF 368, the second IMS 365, the MeNB 810, the SgNB 820, the handover determination module 1201, the UE-A 1601, the base station 1603, the first node 1604, the movable spot 1602, the P-CSCF 1605, the AP 1610, the UE 1700, the one or more processors 1710, the one or more RFICs 1720, the electronic device 1000, the processor unit 1020, the input/output controller 1040, the communication processing unit 1090, the memory interface 1021, the processor 1022 and/or the peripheral device interface 1023 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

As described above, embodiments have been described in the drawings and the specification. Although embodiments have been described in the specification by using a specific term, this is only used for the purpose of describing the technical idea of the present disclosure and is not used to limit the meaning of the disclosure or the scope of the disclosure set forth in the claims.

While the inventive concepts have been particularly shown and described with reference to embodiments thereof, it will be understood that various changes in form and details may be made therein without departing from the spirit and scope of the following claims.

What is claimed is:

1. An operating method of a wireless communication device including a first subscriber identity module (SIM) and a second SIM, the operating method comprising:
   performing a first call with a first device using the first SIM, the first call being based on a first radio access technology (RAT);
   receiving a connection request for a second call from a second device using the second SIM while performing the first call with the first device using the first SIM, the connection request for the second call being based on the first RAT;
   based on receiving the connection request for the second call from the second device, determining whether the first SIM is to perform a handover to a second RAT for the first call;
   performing the handover of the first call to the second RAT in response to determining the first SIM is to perform the handover to the second RAT; and
   contemporaneously performing the second call and the first call after the performing the handover of the first call to the second RAT, the first call being performed using the first SIM, wherein
   the first RAT includes at least one of voice over Long-Term-Evolution (VOLTE) or Voice over New Radio (VoNR), and the second RAT includes Voice over Wireless Fidelity (VoWiFi).

2. The operating method of claim 1, wherein the determining whether the first SIM is to perform the handover to the second RAT is based on:
   a selection by a user of the wireless communication device; and
   at least one of a state of the first RAT, a state of the second RAT or a state of a third RAT, the second RAT including a VoWiFi connection using a mobile network connection of the second SIM, and the third RAT including a VoWiFi connection using a mobile network connection of the first SIM.

3. The operating method of claim 1, wherein the first SIM performs the first call using a network connection of the second SIM.

4. The operating method of claim 1, further comprising:
   determining whether the second SIM is to perform a handover to the second RAT in response to determining the first SIM is not to perform the handover to the second RAT;

performing the handover of the second call to the second RAT in response to determining the second SIM is to perform the handover to the second RAT; and contemporaneously performing the first call and the second call after the performing the handover of the second call to the second RAT, the second call being performed using the second SIM, wherein the second RAT including a VoWiFi connection using a mobile network connection of the first SIM.

5. The operating method of claim 2, wherein the second RAT uses a network based on the second SIM through transmission control protocol/Internet protocol (TCP/IP) and IP sec tunneling.

6. The operating method of claim 5, wherein the second RAT comprises a path including the network based on the second SIM, an evolved Packet Data Gateway (ePDG) corresponding to the first SIM, and a Packet Data Network Gateway (P-GW).

7. The operating method of claim 5, wherein the second RAT comprises a path including the network based on the second SIM, a non-3GPP Interworking Function (N3IWF) corresponding to the first SIM, and a user plane function (UPF).

8. The operating method of claim 1, further comprising:
pausing a Public Land Mobile Network (PLMN) search on the second SIM when the first SIM and the second SIM are converted into an idle state; and
checking the first call based on the first SIM.

9. The operating method of claim 1, wherein a reception frequency band allocated to the first SIM and a reception frequency band allocated to the second SIM are different from each other.

10. The operating method of claim 1, wherein both the first call and the second call comprise packet switched (PS) data.

11. An operating method of a wireless communication device including a first subscriber identity module (SIM) and a second SIM, the operating method comprising:
performing a first call with a first device using the first SIM, the first call being based on a first radio access technology (RAT);
receiving a connection request for a second call from a second device using the second SIM while performing the first call with the first device using the first SIM, the connection request for the second call being based on a second RAT;
based on receiving the connection request for the second call from the second device, determining to maintain the first RAT for the first call; and
performing the first call and the second call by using the first SIM, wherein the first RAT includes Voice over Wireless Fidelity (VoWiFi), and the second RAT includes at least one of voice over Long-Term-Evolution (VOLTE) or Voice over New Radio (VoNR).

12. The operating method of claim 11, wherein the determining to maintain the first RAT comprises determining whether the first SIM is to perform a handover for the first call based on:
a selection by a user of the wireless communication device; and
at least one of a state of the first RAT, a state of the second RAT or a state of a third RAT, the first RAT including a VoWiFi connection using a mobile connection of the second SIM, and the third RAT including a VoWiFi connection using a mobile network connection of the first SIM.

13. The operating method of claim 11, wherein the first SIM performs the first call using a network connection of the second SIM.

14. A wireless communication device comprising:
a first subscriber identity module (SIM);
a second SIM;
a radio frequency integrated circuit (RFIC); and
processing circuitry configured to,
control the first SIM to perform a first call with a first device,
control the second SIM to receive a connection request for a second call from a second device through the RFIC while controlling the first SIM to perform the first call with the first device,
based on receiving the connection request for the second call from the second device, determine whether the first SIM is to perform a handover to a first radio access technology (RAT) for the first call, the first RAT including Voice over Wireless Fidelity (VoWiFi), and
control the first SIM to perform the handover of the first call to the first RAT in response to determining the first SIM is to perform the handover to the first RAT, and
contemporaneously perform the second call and the first call after performing the handover of the first call to the first RAT.

15. The wireless communication device of claim 14, wherein the processing circuitry is configured to determine whether the first SIM is to perform the handover to the first RAT based on:
a selection of a user of the wireless communication device; and
at least one of a state of the first RAT, a state of a second RAT or a state of a third RAT, the first RAT including a VoWiFi connection using a mobile network connection of the second SIM, the second RAT including at least one of voice over Long-Term-Evolution (VOLTE) or Voice over New Radio (VoNR), and the third RAT including a VoWiFi connection using a mobile network connection of the first SIM.

16. The wireless communication device of claim 14, wherein the first SIM performs the first call using a network connection of the second SIM.

17. The wireless communication device of claim 14, wherein the processing circuitry is configured to:
determine whether the second SIM is to perform a handover of the second call to the first RAT in response to determining the first SIM is not to perform the handover to the first RAT;
perform the handover of the second call to the first RAT in response to determining the second SIM is to perform the handover to the first RAT; and
contemporaneously perform the first call and the second call after the handover of the second call to the first RAT,
wherein the first RAT including a VoWiFi connection using a mobile network connection of the first SIM.

18. The wireless communication device of claim 15, wherein the first RAT uses a network based on the second SIM through transmission control protocol (TCP)/Internet protocol (IP) and IP sec tunneling.

19. The wireless communication device of claim 18, wherein the first RAT comprises a path including the network based on the second SIM, an evolved Packet Data Gateway (ePDG) corresponding to the first SIM, and a Packet Data Network Gateway (P-GW).

20. The wireless communication device of claim 18, wherein the first RAT has a path including a network based on the second SIM, non-3GPP Interworking Function (N3IWF) corresponding to the first SIM, and a user plane function (UPF).

\* \* \* \* \*